(12) United States Patent
Minami

(10) Patent No.: US 7,173,099 B1
(45) Date of Patent: Feb. 6, 2007

(54) PROPYLENE POLYMERS AND RESIN COMPOSITION AND MOLDING CONTAINING THE POLYMERS

(75) Inventor: Yutaka Minami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 70 days.

(21) Appl. No.: 10/088,505

(22) PCT Filed: Oct. 5, 2000

(86) PCT No.: PCT/JP00/06943

§ 371 (c)(1),
(2), (4) Date: Mar. 28, 2002

(87) PCT Pub. No.: WO01/25300

PCT Pub. Date: Apr. 12, 2001

(30) Foreign Application Priority Data

| Oct. 5, 1999 | (JP) | ................................. | 11/284608 |
| Oct. 5, 1999 | (JP) | ................................. | 11/284609 |
| Feb. 22, 2000 | (JP) | ............................. | 2000/043976 |

(51) Int. Cl.
*C08F 10/06* (2006.01)
*C08F 4/6392* (2006.01)
*C08F 4/642* (2006.01)

(52) U.S. Cl. ..................... 526/351; 526/133; 526/134; 526/160; 526/165; 526/943

(58) Field of Classification Search ............... 526/351, 526/348, 160, 943, 133, 134, 165; 502/152
See application file for complete search history.

(56) References Cited

U.S. PATENT DOCUMENTS

| 4,112,208 A | 9/1978 | McConnell et al. |
| 4,998,928 A | 3/1991 | Maletsky et al. |
| 5,708,101 A * | 1/1998 | Bercaw et al. |
| 5,998,039 A * | 12/1999 | Tanizaki et al. |
| 6,316,561 B1 | 11/2001 | Kanzawa |
| 6,339,135 B1 | 1/2002 | Kashiwamura et al. |

FOREIGN PATENT DOCUMENTS

| EP | 721954 | 7/1996 |
| EP | 818458 | 1/1998 |
| EP | 0 970 974 A1 | 1/2000 |
| EP | 1 095 951 A1 | 5/2001 |
| JP | 10-259207 | 9/1998 |
| JP | 11-130807 | 5/1999 |
| JP | 2000-007731 | 1/2000 |
| WO | WO 99/20664 | 4/1999 |
| WO | 99/67303 | 12/1999 |
| WO | WO99/67303 | 12/1999 |

OTHER PUBLICATIONS

Patent Abstracts of Europe, EP 1 095 951, May 2, 2001.

* cited by examiner

*Primary Examiner*—Caixia Lu
(74) *Attorney, Agent, or Firm*—Oblon, Spivak, McClelland, Maier & Neustadt, P.C.

(57) ABSTRACT

The propylene polymer of the present invention satisfies (1) a 25° C. hexane soluble content (H25) of 0–80 wt %; and (2) either no melting temperature (Tm) measurable by differential scanning calorimetry (DSC), or a melting temperature (Tm) satisfying, if measurable by DSC, the following relationship: $\Delta H \geq 3 \times (Tm-120)$ wherein $\Delta H$ is a melting endotherm (J/g). The propylene homopolymer of the present invention satisfies (1) a meso pentad fraction (mmmm) of 30–60 mol %; (2) a racemic pentad fraction (rrrr) satisfying the following relationship: $[rrrr/(1-mmmm)] \leq 0.1$; (3) a fraction (W25) eluted at a temperatures up to 25° C. by temperature-programmed chromatography, of from 20–100 wt %; and, (4) a pentad fraction (rmrm) of more than 2.5 mol %. The propylene copolymer of the present invention satisfies (1) a stereoregularity index (P) of 55–90 mol % as determined by $^{13}$C-NMR measurement; and (2) a fraction (W25) eluted at a temperatures up to 25° C. by temperature-programmed chromatography, of from 20–100 wt %.

10 Claims, No Drawings

PROPYLENE POLYMERS AND RESIN COMPOSITION AND MOLDING CONTAINING THE POLYMERS

TECHNICAL FIELD

The present invention relates to a propylene polymer, and a resin composition, a molded product and a resin modifier composed of the polymer. More particularly, the present invention relates to a propylene polymer capable of forming molded products having a less stickiness as well as excellent softness and transparency, a resin composition composed of said polymer, a molded product and a resin modifier.

BACKGROUND ART

Although vinyl chloride resin has been widely used in the prior art as a soft resin, since vinyl chloride resins are known to generate harmful substances during the course of their combustion, there is a strong desire for an alternative product. Propylene polymer is an alternative to soft vinyl chloride resin. Propylene polymer has been produced in the presence of various catalysts. When propylene polymer produced using catalytic systems of the prior art are attempted to be made softer (namely to have a low elastic modulus), there is the shortcoming of an increase in the amount of sticky components. That is, conventional attempts for attaining soft polymers leads to the increase in APP components causing stickiness, resulting in poor surface characteristics of the resulting molded product. In addition, in the case where such a propylene polymer is formed into molded products such as sheets or films used in food, health care and other applications, there is the risk of causing various problems. Therefore, there is a need for a propylene polymer that offers an improved balance between elastic modulus and the amount of sticky components.

DISCLOSURE OF THE INVENTION

The object of the present invention is to provide a propylene polymer capable of forming molded products having a less stickiness as well as excellent softness and transparency, and a resin composition, a molded product and a resin modifier composed of the polymer.

As a result of extensive researches in view of the above object, the inventors have found that a propylene polymer having (1) a specific 25° C. hexane soluble content and (2) either no melting temperature (Tm) measurable by DSC, or a melting temperature (Tm) satisfying, if measurable by DSC, a specific relationship with a melting endotherm thereof, exhibits an excellent balance between amount of sticky components, elastic modulus and transparency. The present invention has been accomplished based on the above finding. Namely, the present invention provides the propylene polymer, and the resin composition, molded product and resin modifier composed of the polymer as mentioned below.

1. A propylene polymer satisfying the following (1) and (2):
   (1) a 25° C. hexane soluble content (H25) of 0–80 wt %; and,
   (2) either no melting temperature Tm (° C.) measurable by differential scanning calorimetry (DSC), or a melting temperature (Tm) satisfying, if measurable by DSC, the following relationship:

$\Delta H \geq 3 \times (Tm-120)$.

wherein $\Delta H$ is a melting endotherm (J/g).

2. The propylene polymer described in the above item 1, having a fraction (W25) eluted at a temperatures up to 25° C. by temperature-programmed chromatography, of from 20–100 wt %.

3. A propylene homopolymer satisfying the following (1) to (4):
   (1) a meso pentad fraction (mmmm) of 30–60 mol %;
   (2) a racemic pentad fraction (rrrr) satisfying the following relationship:

$[rrrr/(1-mmmm)] \leq 0.1$ (3) a fraction (W25) eluted at a temperatures up to 25° C. by temperature-programmed chromatography, of from 20–100 wt %; and,
   (4) a pentad fraction (rmrm) of more than 2.5 mol %.

4. The propylene homopolymer described in the above item 3, satisfying the following relationship:

$(mm) \times (rr)/(mr)^2 \leq 2.0$ wherein (mm) is a meso triad fraction; (rr) is a racemic triad fraction; and (mr) is a triad fraction.

5. A propylene copolymer satisfying the following (1) and (2):
   (1) a stereoregularity index (P) of 55–90 mol % as determined by $^{13}$C-NMR measurement; and
   (2) a fraction (W25) eluted at a temperatures up to 25° C. by temperature-programmed chromatography, of from 20–100 wt %.

6. The propylene homopolymer described in the above item 3 or 4, or the propylene copolymer described in the above item 5, having a molecular weight distribution (Mw/Mn) of 4 or less as measured by gel permeation chromatography (GPC) and/or an intrinsic viscosity [α] of 0.5–15.0 dl/g as measured at 135° C. in tetralin.

7. The propylene homopolymer described in any one of the above items 3, 4 and 6, produced by polymerizing propylene in the presence of a polymerization catalyst comprising:
   (A) a transition metal compound represented by the general formula

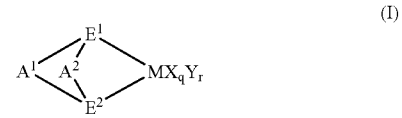

(I)

wherein M is a metal element of Groups 3 to 10 of the Period Table or lanthanoid series;

$E^1$ and $E^2$ are respectively a ligand selected from the group consisting of substituted cyclopentadienyl, indenyl, substituted indenyl, heterocyclopentadienyl, substituted heterocyclopentadienyl, amide, phosphide, a hydrocarbon group and a silicon-containing group, which form a cross-linked structure via $A^1$ and $A^2$ and may be the same or different;

X is a ligand capable of forming a σ-bond or π-bond with the proviso that when a plurality of X groups are present, these groups may be the same or different, and may be cross-linked with the other X group, $E^1$, $E^2$ or Y;

Y is a Lewis base with the proviso that when a plurality of Y groups are present, these groups may be same or different, and may be cross-linked with the other Y group, $E^1$, $E^2$ or X;

$A^1$ and $A^2$ are divalent cross-linking groups capable of bonding the two ligands $E^1$ and $E^2$ to each other, are respectively a $C_1$–$C_{20}$ hydrocarbon group, a $C_1$–$C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ is a hydrogen atom, a halogen atom, a $C_1$–$C_{20}$ hydrocarbon group or a $C_1$–$C_{20}$ halogen-containing hydrocarbon group, and may be the same or different;

q is an integer of 1 to 5 given by the formula:

[(valence of M)–2]; and r is an integer of 0 to 3, and (B) a component selected from the group consisting of (B-1) a compound capable of forming an ionic complex by reacting with the transition metal compound (A) or a derivative thereof, (B-2) aluminoxane, and (B-3) a Lewis acid.

8. The propylene copolymer described in the above item 5 or 6, produced by copolymerizing propylene with ethylene and/or a $C_4$–$C_{20}$ α-olefin in the presence of a polymerization catalyst comprising:

(A) a transition metal compound represented by the general formula

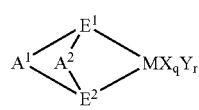

(I)

wherein M is a metal element of Groups 3 to 10 of the Period Table or lanthanoid series;

E$^1$ and E$^2$ are respectively a ligand selected from the group consisting of substituted cyclopentadienyl, indenyl, substituted indenyl, heterocyclopentadienyl, substituted heterocyclopentadienyl, amide, phosphide, a hydrocarbon group and a silicon-containing group, which form a cross-linked structure via A$^1$ and A$^2$ and may be the same or different;

X is a ligand capable of forming a σ-bond or π-bond with the proviso that when a plurality of X groups are present, these groups may be the same or different, and may be cross-linked with the other X group, E$^1$, E$^2$ or Y;

Y is a Lewis base with the proviso that when a plurality of Y groups are present, these groups may be same or different, and may be cross-linked with the other Y group, E$^1$, E$^2$ or X;

A$^1$ and A$^2$ are divalent cross-linking groups capable of bonding the two ligands E$^1$ and E$^2$ to each other, are independently a $C_1$–$C_{20}$ hydrocarbon group, a $C_1$–$C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ is a hydrogen atom, a halogen atom, a $C_1$–$C_{20}$ hydrocarbon group or a $C_1$–$C_{20}$ halogen-containing hydrocarbon group, and may be the same or different;

q is an integer of 1 to 5 given by the formula:

[(valence of M)–2]; and r is an integer of 0 to 3, and (B) a component selected from the group consisting of (B-1) a compound capable of forming an ionic complex by reacting with the transition metal compound (A) or a derivative thereof, (B-2) aluminoxane, and (B-3) a Lewis acid.

9. A propylene resin composition comprising the propylene polymer, the propylene homopolymer or the propylene copolymer described in any one of the above items 1 to 8, and a nucleating agent.

10. A molded product produced by molding the propylene polymer, the propylene homopolymer, the propylene copolymer or the propylene resin composition described in any one of the above items 1 to 9.

11. A propylene resin modifier comprising the propylene polymer, the propylene homopolymer or the propylene copolymer described in any one of the above items 1 to 8.

12. A polymerization catalyst comprising:

(A') a transition metal compound represented by the general formula (II):

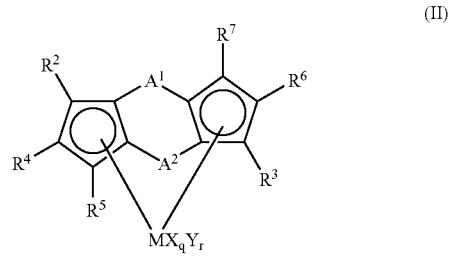

(II)

wherein, M, X, Y, A$^1$, A$^2$, q and r are the same as defined in the above general formula (I); R$^2$ through R$^7$ are respectively a hydrogen atom, a halogen atom, a $C_1$–$C_{20}$ hydrocarbon group, a $C_1$–$C_{20}$ halogen-containing hydrocarbon group, a silicon-containing group or a heteroatom-containing group with the proviso that at least one of R$^2$ through R$^7$ is not a hydrogen atom; and R$^2$ through R$^7$ may be the same or different, and adjacent groups of R$^2$ through R$^7$ may be bonded to each other to form a ring, and (B) a component selected from the group consisting of (B-1) a compound capable of forming an ionic complex by reacting with the transition metal compound (A) or a derivative thereof, (B-2) aluminoxane, and (B-3) a Lewis acid.

13. A polymerization catalyst comprising:

(A") a transition metal compound represented by the general formula

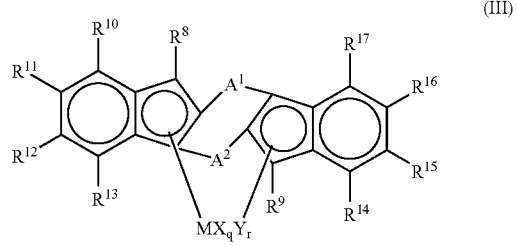

(III)

wherein, M, X, Y, A$^1$, A$^2$, q and r are the same as defined in the above general formula (I); at least one of R$^8$ and R$^9$ represents a group containing a heteroatom such as oxygen, halogen and silicon; and $R^{10}$ through $R^{17}$ are respectively a hydrogen atom, a $C_1$–$C_{20}$ hydrocarbon group, or a group containing a heteroatom such as oxygen, halogen and silicon, and (B) a component selected from the group consisting of
(B-1) a compound capable of forming an ionic complex by reacting with the transition metal compound (A) or a derivative thereof, (B-2) aluminoxane, and (B-3) a Lewis acid.

BEST MODE FOR CARRYING OUT THE INVENTION

The propylene polymer [1], production method therefor [2], propylene resin composition [3], molded product [4] and propylene resin modifier [5] according the present invention, are described in detail below.

[1] Propylene Polymer

The propylene polymer of the present invention is a polymer satisfying the following requirements (1) and (2):
(1) a 25° C. hexane soluble content (H25) of 0–80 wt %; and,
(2) either no melting temperature Tm (° C.) measurable by differential scanning calorimetry (DSC), or a melting temperature (Tm) satisfying, if measurable by DSC, the following relationship:

$$\Delta H \geq 3 \times (Tm-120).$$

wherein $\Delta H$ is a melting endotherm (J/g).

The 25° C. hexane soluble content (H25) of the propylene polymer of the present invention is 0–80 wt %, preferably 0–50 wt %, and more preferably 0–25 wt %. The H25 is an index showing a content of so-called sticky components causing defects such as stickiness and deteriorated transparency. The higher H25 means a larger content of the sticky components. When the H25 exceeds 80 wt %, the obtained polymer tends to be deteriorated in anti-blocking properties and transparency because of the large content of sticky components, and prevents the polymer from being used in food and health care applications.

Meanwhile, the H25 is a weight reduction rate calculated from the following formula:

$$H25=[(W_0-W_1)/W_0] \times 100 \ (\%)$$

wherein $W_0$ is an initially measured weight of the propylene polymer; and $W_1$ is a weight thereof measured after the propylene polymer is allowed to stand at 25° C. for 3 or more days in 200 ml of hexane and then dried.

Further, the propylene polymer of the present invention has either no melting temperature Tm (° C.) measurable by DSC, or a melting temperature Tm (° C.) satisfying, if measurable by the DSC, the following relationship between the Tm and the melting endotherm $\Delta H$ represented by the following formula:

$$\Delta H \geq 3 \times (Tm-120)$$

preferably, $\Delta H \geq 2 \times (Tm-100)$

The Tm and $\Delta H$ are determined by the DSC measurement. More specifically, a melting endotherm curve is first prepared by the following method using a differential scanning colorimeter ("DSC-7" available from Perkin-Elmer Corp.). That is, 10 mg of a sample is melted at 230° C. for 3 minutes in a nitrogen atmosphere, and then cooled up to 0° C. at a temperature drop rate of 10° C./minute. The cooled material is allowed to stand at 0° C. for 3 minutes, and then heated at a temperature rise rate of 10° C./minute. The peak top of a maximum peak observed in the thus prepared melting endotherm curve is determined to be the melting temperature Tm, and the change rate of enthalpy observed thereupon is determined to be the melting endotherm $\Delta H$.

The propylene polymer satisfying the above requirements enables the production of a molded product that is well-balanced between an amount of sticky components, elastic modulus and transparency. That is, the obtained molded product advantageously has a low elastic modulus, an excellent softness (also referred to as flexibility), less stickiness, excellent surface properties (typified by less bleeding of sticky components, less migration of sticky components to other articles and the like) and excellent transparency.

In addition to the above requirements, the propylene polymer of the present invention preferably contains a fraction (W25) eluted at temperatures up to 25° C. in an amount of from 20 to 100 wt %, more preferably from 30 to 100 wt %, most preferably from 50 to 100 wt %, as measured by temperature-programmed chromatography. The W25 is an index showing whether the propylene polymer is soft or not. The higher W25 means a larger content of components having high elastic modulus and a broader stereoregularity distribution. When the W25 is less than 20 wt %, the propylene polymer tends to be undesirably deteriorated in flexibility. Meanwhile, the W25 is determined as an amount (wt %) of a fraction eluted, without being adsorbed in a TREF column filler, at a column temperature of 25° C. based on an elution curve measured by temperature-programmed chromatography by using the measuring method, apparatus and conditions described below.

(a) Measuring Method

A sample solution is introduced into a TREF column controlled to 135° C., and then cooled gradually down to 0° C. at a temperature drop rate of 5° C./minute. The cooled sample solution is held at 0° C. for 30 minutes, and then absorbed into a surface of a filler for crystallization thereof. Then, the column is heated to 135° C. at a temperature rise rate of 40° C./hour. The elution curve is prepared through the above procedure.

(b) Apparatus

TREF column: Silica gel column (4.6+×150 mm) available from GL Science Co., Ltd.;

Flow cell: KBr cell with an optical path length of 1 mm, available from GL Science Co., Ltd.;

Feed Pump: Pump "SSC-3100" available from Senshu Scientific Co., Ltd.;

Valve oven: Oven "MODEL 554" (high-temperature type)" available from GL Science Co., Ltd.;

TREF oven: available from GL Science Co., Ltd.;

Two-line temperature controller: Temperature controller "REX-C100" available from Rigaku Kogyo Co., Ltd.;

Detector: IR Detector "MIRAN 1A CVF" for liquid chromatogram, available from FOXBORO Co., Ltd.;

10-way valve: Electric valve available from Balco Co., Ltd.; and

Loop: 500 µl loop available from Balco Co., Ltd.

(c) Measuring Conditions

Solvent: o-dichlorobenzene;

Sample concentration: 7.5 g/l;

Sample amount: 500 µl;

Pump discharge: 2.0 ml/min;

Detection wave number: 3.41 µm;

Column filler: CHROMOSORB P (30–60 mesh); and

Column temperature distribution: within ±0.2° C.

The propylene polymer of the present invention is not particularly restricted as long as it satisfies the above requirements. Examples of the propylene polymer include a propylene homopolymer and a propylene copolymer. Of these, preferred are the following propylene homopolymer [a] and propylene copolymer [a'].

[a]Propylene homopolymer

The propylene homopolymer of the present invention is a polymer satisfying the following requirements (1) to (4):

(1) a meso pentad fraction (mmmm) of from 30 to 60 mol %;
(2) a racemic pentad fraction (rrrr) satisfying the following formula:

[rrrr/(1−mmmm)]−0.1;

(3) a fraction (W25) eluted at a temperatures up to 25° C. by temperature-programmed chromatography, of from 20–100 wt %; and
(4) a pentad fraction (rmrm) of more than 2.5 mol %.

The propylene homopolymer satisfying the above requirements enables the production of a molded product that is well-balanced between an amount of sticky components, elastic modulus and transparency. That is, the obtained molded product advantageously has a low elastic modulus, an excellent softness (also referred to as flexibility), less stickiness, excellent surface properties (typified by less bleeding of sticky components, less migration of sticky components to other articles and the like) and excellent transparency.

The meso pentad fraction (mmmm) described herein means a meso fraction in pentad units in polypropylene molecular chain as measured using methyl signals in $^{13}$C-NMR spectra according to the method proposed by A. Zambelli et al., "Macromolecules", No. 6, p. 925 (1973). The larger value of the meso pentad fraction means a higher stereoregularity. When the meso pentad fraction (mmmm) of the propylene homopolymer of the present invention is less than 30 mol %, the polymer tends to become sticky. When the meso pentad fraction (mmmm) exceeds 60 mol %, the polymer tends to show a high elastic modulus. Also, the racemic pentad fraction (rrrr) means a racemic fraction in pentad units in polypropylene molecular chain. The value of [rrrr/(1−mmmm)] is determined from the above fractions in pentad units, and is an index indicating uniformity of the regularity distribution of the propylene homopolymer. The larger value of [rrrr/(1−(mmmm)] means a broader regularity distribution, i.e., the polymer is present in the form of a mixture of a high-stereoregular polypropylene (PP) and amorphous polypropylene (APP) like conventional polypropylene produced in the presence of existing catalyst systems, so that the obtained polymer exhibits increased stickiness and deteriorated transparency. When the value of [rrrr/(1−mmmm)] of the propylene homopolymer of the present invention exceeds 0.1, the polymer tends to become sticky. The $^{13}$C-NMR spectra were measured according to the method for determining the attribution of peaks as proposed by A. Zambelli in "Macromolecules", 8, p. 687 (1975), using the following apparatus and conditions:

Apparatus: $^{13}$C-NMR spectrometer "JNM-EX400 Model" available from Nippon Denshi Co., Ltd.;
Method: Proton complete decoupling method;
Sample concentration: 220 mg/ml;
Solvent: mixed solvent of 1,2,4-trichlorobenzene and heavy benzene (volume ratio: 90:10);
Measuring temperature: 130° C.;
Pulse width: 450;
Pulse repetition period: 4 seconds; and
Cumulative frequency: 10,000 times.

Next, the definition and the measuring method for W25 of the propylene homopolymer of the present invention are the same as described in the above propylene polymer [1]. When the W25 is less than 20%, the propylene homopolymer fails to show a good flexibility.

Among the above requirements, the propylene homopolymer of the present invention preferably satisfies:

(5) a meso pentad fraction (mmmm) of from 30 to 50 mol %;
(6) a racemic pentad fraction (rrrr) satisfying the following formula:

[rrrr/(1−mmmm)]≦0.08; and (7) a fraction (W25) eluted at a temperatures up to 25° C. by temperature-programmed chromatography, of from 30–100 wt %, more preferably satisfies:
(8) a racemic pentad fraction (rrrr) satisfying the following formula:

[rrrr/(1−mmmm)]≦0.06; and (9) a fraction (W25) eluted at a temperatures up to 25° C. by temperature-programmed chromatography, of from 50–100 wt %, and most preferably satisfies:
(10) a racemic pentad fraction (rrrr) satisfying the following formula:

[rrrr/(1−mmmm)]−0.05; and

(11) a fraction (W25) eluted at a temperatures up to 25° C. by temperature-programmed chromatography, of from 60–100 wt %.

In addition, the propylene homopolymer of the present invention is required to have (4) a pentad fraction (rmrm) of more than 2.5 mol %. When the pentad fraction (rmrm) exceeds 2.5 mol %, the obtained polymer is further increased in randomness and transparency. The propylene homopolymer of the present invention more preferably satisfies the following relationship:

$(mm) \times (rr)/(mr)^2 \leq 2.0$ wherein (mm) is a meso triad fraction; (rr) is a racemic triad fraction; and (mr) is a triad fraction.

This relationship expresses the degree of randomness of the polymer. The closer this value is to 1, the higher degree of randomness and transparency, and the better the balance between flexibility and elastic recovery ratio. For the propylene homopolymer of the present invention, the value of the left side of the above equation is usually 2 or less, preferably 1.8–0.5, and more preferably 1.5–0.5. Furthermore, the triad fraction may be determined in the same manner as the above pentad fraction.

In addition to the above requirements, the propylene homopolymer of the present invention preferably has a molecular weight distribution (Mw/Mn) of 4.0 or less as measured by gel permeation chromatography (GPC), and/or an intrinsic viscosity [η] of 0.5 to 15 dl/g as measured at 135° C. in tetralin. More preferably, the Mw/Mn is 3.5 or less and/or the [η] is 1.0–5.0 dl/g, and still more preferably, the Mw/Mn is 3 or less and/or the [η] is 1.0–3.0 dl/g. In particular, the [η] is still more preferably 1.2–3.0 dl/g, and most preferably 1.5–2.5 dl/g. When the molecular weight distribution (Mw/Mn) exceeds 4.0, the resulting polymer tends to become sticky. When the intrinsic viscosity [α]is less than 0.5 dl/g, the resulting polymer also tends to become sticky. When the intrinsic viscosity [η] exceeds 15.0 dl/g, the resulting polymer has poor moldability due to deteriorated fluidity.

Meanwhile, the value of Mw/Mn was calculated from values of weight-average molecular weight Mw and number-average molecular weight Mn which were measured in terms of polystyrene by gel permeation chromatography (GPC) using the following apparatus and conditions:

GPC: Column: TOSO GMHHR—H(S)HT;
  Detector: RI Detector "WATERS 150C" for liquid chromatogram; and
Measuring conditions:
  Solvent: 1,2,4-trichlorobenzene;
  Measuring temperature: 145° C.;
  Flow rate: 1.0 ml/min.;
  Sample concentration: 2.2 mg/ml;
  Sample amount: 160 μl;
  Calibration curve: Universal Calibration; and
  Analytic program: HT-GPC (Ver. 10).

In addition to the above requirements, the melting endotherm ΔH of the propylene homopolymer is preferably 20 J/g or less as measured by DSC for excellent flexibility. The ΔH is an index showing whether the polymer is soft or not. The larger ΔH means a higher elastic modulus and deterioration in flexibility. Meanwhile, the ΔH is determined by the same method as described above.

Further, the propylene homopolymer of the present invention may or may not have a melting temperature (Tm) and a crystallization temperature (Tc). From the standpoint of flexibility, it is preferable that the propylene homopolymer has either no Tm and Tc or low Tm and Tc. More specifically, the Tm is, if measurable, preferably 100° C. or lower. Meanwhile, the Tm and Tc are determined by DSC measurement using a differential scanning calorimeter ("DSC-7" available from Perkin Elmer Co., Ltd.) as follows. Namely, 10 mg of a sample is melted at 230° C. for 3 minutes in a nitrogen atmosphere, and then cooled up to 0° C. at a temperature drop rate of 10° C./minute. The crystallization exotherm curve was prepared through the above procedure. The peak top of maximum peak observed in the thus prepared crystallization exotherm curve was determined to be a crystallization temperature Tc (° C.) of the sample. Further, the sample is held at 10° C. for 3 minutes, and then heated at a temperature rise rate of 10° C./minute, thereby preparing a melting endotherm curve. The peak top of a maximum peak observed in the thus prepared melting endotherm curve is determined to be the melting temperature Tm.

In general, the polymerization of propylene usually proceeds by so-called 1,2-insertion in which carbon atom located on the methylene side of a propylene monomer is bonded to active site of a catalyst, and propylene monomers are sequentially coordinated and polymerized in a similar manner. However, there is a possibility that 2,1-insertion or 1,3-insertion (also called abnormal insertion) occurs, though it is a rare case. The propylene homopolymer of the present invention is preferably substantially free from the 2,1-insertion or 1,3-insertion. Further, the ratio between contents of these insertions preferably satisfies the following formula (1):

$$[(m^{-2,1})+(r-2,1)+(1,3)] \leq 5.0\% \quad (1)$$

wherein $(m^{-2,1})$ is a content (%) of 2,1-meso insertion as measured by $^{13}$C-NMR; $(r-2,1)$ is a content (%) of 2,1-racemic insertion as measured by $^{13}$C-NMR; and $(1,3)$ is a content (%) of 1,3-insertion as measured by $^{13}$C-NMR, more preferably satisfies the following formula (2):

$$[(m^{-2,1})+(r-2,1)+(1,3)] \leq 1.0\% \quad (2), \text{ and}$$

most preferably satisfies the following formula (3):

$$[(m^{-2,1})+(r-2,1)+(1,3)] \leq 0.1\% \quad (3).$$

The polymer incapable of satisfying the formula (1) is deteriorated in crystallinity beyond expectation, resulting in increased stickiness.

The insertion contents $(m^{-2,1})$, $(r-2,1)$ and $(1,3)$ are calculated from integrated intensities of respective peaks in $^{13}$C-NMR spectra which are determined to be attributed to the respective insertions according to the method reported in Grassi, et al., "Macromolecules", No. 21, p. 617 (1988) and Busico, et al., "Macromolecules", No. 27, p. 7538 (1994). Specifically, the content $(m^{-2,1})$ is a 2,1-meso insertion content (%) calculated from a ratio of an integrated intensity of peak attributed to Pα, γ threo observed near 17.2 ppm to that of a whole methyl carbon region. The content (r-2, 1) is a 2,1-racemic insertion content (%) calculated from a ratio of an integrated intensity of peak attributed to Pα, γ threo observed near 15.0 ppm to that of a whole methyl carbon region. The content (1,3) is a 1,3-insertion content (%) calculated from a ratio of an integrated intensity of peak attributed to Tβ, γ+ observed near 31.0 ppm to that of a whole methyl carbon region.

Further, the propylene homopolymer of the present invention more preferably shows substantially no peak attributed to a molecular chain end (n-butyl) derived from the 2,1-insertion upon $^{13}$C-NMR spectra measurement. With respect to the molecular chain end derived from the 2,1-insertion, the respective insertion contents are calculated from integrated intensities of peaks in $^{13}$C-NMR spectra which are determined to be attributed to the respective insertions according to the method reported in Jungling, et al., "J. Polym. Sci.: Part A: Polym. Chem.", No. 33, p. 1305 (1995). Meanwhile, in the case of isotactic polypropylene, the peak appearing near 18.9 ppm is attributed to the end methyl carbon of n-butyl. The $^{13}$C-NMR spectra measurements of the abnormal insertion and the molecular chain end may be performed by using the same apparatus and conditions as described above.

Still further, the propylene homopolymer of the present invention preferably contains a fraction extracted with boiling diethyl ether, as an index of elastic modulus, in an amount of 5 wt % or more. The fraction extracted with boiling dimethyl ether is measured using a Soxhlet extractor under the following conditions:

Sample amount: 1–2 g;
Sample form: powder (pelletized sample was powdered by pulverization);
Extractant: diethyl ether;
Extraction time: 10 hours;
Extraction frequency: 180 times or more; and
Calculation method: calculated from the following equation:

[Amount of a fraction extracted with diethyl ether (g)/weight of powder charged (g)]×100.

In addition to the above, the tensile modulus of the propylene homopolymer of the present invention is preferably 100 MPa or lower, more preferably 70 MPa or lower. The tensile modulus of the propylene homopolymer is preferably 6 MPa or higher. When the tensile modulus of the propylene homopolymer is less than 6 MPa, the molded product obtained from such a propylene homopolymer tends to be deteriorated in shape retentivity.

[a'] Propylene Copolymer

The propylene copolymer of the present invention is a copolymer produced by copolymerizing propylene with ethylene and/or a $C_4$–$C_{20}$ α-olefin, and satisfies the following requirements of (1) and (2):
(1) a stereoregularity index (P) of 55–90 mol % as determined by $^{13}$C-NMR measurement; and
(2) a fraction (W25) eluted at a temperatures up to 25° C. by temperature-programmed chromatography, of from 20–100 wt %.

The propylene copolymer satisfying the above requirements enables the production of a molded product that is well-balanced between an amount of sticky components, elastic modulus and transparency. That is, the obtained molded product has a low elastic modulus, excellent softness (also referred to as flexibility), less stickiness, good surface properties (typified by less bleeding of sticky components, less migration of sticky components to other articles and the like) and excellent transparency. The stereoregularity index (P) is determined based on a meso triad fraction [mm] in propylene chains in $^{13}$C-NMR spectra as measured using an NMR spectrometer "JNM-EX400 Model" available from Nippon Denshi Co., Ltd. under the same conditions as described above. The larger value of P means higher stereoregularity of the copolymer. The stereoregularity index (P) of the propylene copolymer of the present invention is more preferably from 65 to 80 mol %. When the stereoregularity index (P) is less than 55 mol %, the copolymer has poor moldability due to deteriorated elastic modulus. When the stereoregularity index (P) exceeds 90 mol %, the copolymer tends to become hard. The W25 value of the propylene copolymer is preferably 30 to 100 wt %, more preferably 50 to 100 wt %. When the W25 is less than 20 wt %, the propylene copolymer fails to show a good flexibility. Meanwhile, the definition and the measuring method for W25 of the propylene copolymer are the same as described above.

In addition to the above requirements, the propylene copolymer of the present invention preferably has a molecular weight distribution (Mw/Mn) of 4 or less as measured by gel permeation chromatography. (GPC), and/or an intrinsic viscosity [η] of 0.5 to 15.0 dl/g as measured at 135° C. in tetralin. More preferably, the Mw/Mn is 3.5 or less and/or the [η] is 1.0–5.0 dl/g, and still more preferably, the Mw/Mn is 3 or less and/or the [η] is 1.0–3.0 dl/g. When the molecular weight distribution (Mw/Mn) exceeds 4, the resulting polymer tends to become sticky. When the intrinsic viscosity [η] is less than 0.5 dl/g, the resulting polymer also tends to become sticky. When the intrinsic viscosity [η] exceeds 15.0 dl/g, the resulting polymer has poor moldability due to deteriorated fluidity. Meanwhile, the measuring method for the Mw/Mn of the propylene copolymer is the same as described above.

In addition to the above requirements, the propylene copolymer of the present invention preferably has a melting endotherm ΔH of 20 J/g or lower as measured by DSC for excellent flexibility. Further, the propylene copolymer may or may not have a melting temperature (Tm) and a crystallization temperature (Tc). From the standpoint of flexibility, it is preferable that the propylene copolymer has either no Tm and Tc or low Tm and Tc. More specifically, the Tm is, if measurable, preferably 100° C. or lower. Meanwhile, the measuring methods for the ΔH, Tm and Tc of the propylene copolymer are the same as described above.

Further, in addition to the above requirements, the propylene copolymer preferably contains a fraction extracted with boiling diethyl ether, as an index of elastic modulus, in an amount of 5 wt % or more. Meanwhile, the method for measuring the fraction extracted with boiling diethyl ether is the same as described above.

Furthermore, the tensile modulus of the propylene copolymer is preferably 100 MPa or lower, more preferably 70 MPa or lower. The tensile modulus of the propylene copolymer is preferably 6 MPa or higher. When the tensile modulus of the propylene copolymer is less than 6 MPa, the molded product obtained from such a propylene copolymer tends to be deteriorated in shape retentivity.

Examples of the $C_4$–$C_{20}$ α-olefins used for producing the propylene copolymer of the present invention, include ethylene, 1-butene, 1-pentene, 4-methyl-1-pentene, 1-hexene, 1-octene, 1-decene, 1-dodecene, 1-tetradecene, 1-hexadecene, 1-octadecene, 1-eicocene or the like. In the present invention, these olefins may be used alone or in the form of a mixture of any two or more thereof.

Also, the propylene copolymer is preferably a random copolymer containing structural units resulting from propylene in an amount of preferably 90 mol % or more, more preferably 95 mol % or more. [Production methods of propylene homopolymer (a) and propylene copolymer (a')]

The propylene homopolymer (a) and the propylene copolymer (a') of the present invention are respectively produced by homopolymerizing propylene and by copolymerizing propylene with ethylene and/or a $C_4$–$C_{20}$ α-olefin, in the presence of a so-called metallocene catalyst. Examples of the metallocene catalysts include transition metal compounds having 1 or 2 ligands selected from cyclopentadienyl, substituted cyclopentadienyl, indenyl, substituted indenyl and the like, and catalysts using the transition metal compound having the geometrically controlled ligands in combination with an auxiliary catalyst, as described in Japanese Patent Application Laid-open Nos. 58-19309, 61-130314, 3-163088, 4-300887, 4-211694 and 1-502036.

In the present invention, the homopolymerization of propylene or the copolymerization of propylene with ethylene and/or a $C_4$–$C_{20}$ α-olefin, is preferably performed in the presence of a transition metal compound having ligands forming a cross-linked structure via cross-linking groups, more preferably such a metallocene catalyst composed of the combination of a transition metal compound having a cross-linked structure formed via two cross-linking groups, and an auxiliary catalyst.

More specifically, the homopolymerization of propylene or the copolymerization of propylene with ethylene and/or a $C_4$–$C_{20}$ α-olefin, is performed in the presence of a polymerization catalyst comprising:
 (A) a transition metal compound represented by the general formula

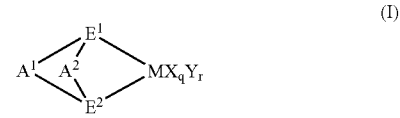

(I)

wherein M is a metal element of Groups 3 to 10 of the Period Table or lanthanoid series;
 $E^1$ and $E^2$ are respectively a ligand selected from the group consisting of substituted cyclopentadienyl, indenyl, substituted indenyl, heterocyclopentadienyl, substituted heterocyclopentadienyl, amide, phosphide, a hydrocarbon group and a silicon-containing group, which form a cross-linked structure via $A^1$ and $A^2$ and may be the same or different;

X is a ligand capable of forming a σ-bond or π-bond with the proviso that when a plurality of X groups are present, these groups may be the same or different, and may be cross-linked with the other X group, $E^1$, $E^2$ or Y;

Y is a Lewis base with the proviso that when a plurality of Y groups are present, these groups may be same or different, and may be cross-linked with the other Y group, $E^1$, $E^2$ or X;

$A^1$ and $A^2$ are divalent cross-linking groups capable of bonding the two ligands $E^1$ and $E^2$ to each other, are respectively a $C_1$–$C_{20}$ hydrocarbon group, a $C_1$–$C_{20}$ halogen-containing hydrocarbon group, a silicon-containing group, a germanium-containing group, a tin-containing group, —O—, —Co—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, a $C_1$–$C_{20}$ hydrocarbon group or a $C_1$–$C_{20}$ halogen-containing hydrocarbon group, and may be the same or different;

q is an integer of 1 to 5 given by the formula:

[(valence of M)–2]; and r is an integer of 0 to 3, and (B) a component selected from the group consisting of (B-1) a compound capable of forming an ionic complex by reacting with the transition metal compound (A) or a derivative thereof, (B-2) aluminoxane, and (B-3) a Lewis acid.

In the above general formula (I), M represents a metal element belonging to Groups 3 to 10 of the Period Table or lanthanoid series. Specific examples of the metal elements include titanium, zirconium, hafnium, yttrium, vanadium, chromium, manganese, nickel, cobalt, palladium and lanthanoid series metals. Of these, titanium, zirconium and hafnium are preferred from the standpoint of olefin polymerization activity and so forth. $E^1$ and $E^2$ respectively represent a ligand selected from the group consisting of a substituted cyclopentadienyl group, indenyl group, substituted indenyl group, heterocyclopentadienyl group, substituted heterocyclopentadienyl group, amide group (—N<), phosphide group (—P<), hydrocarbon group (>CR—, >C<) and silicon-containing group (>SiR—, >Si<) (where, R is hydrogen, a $C_1$–$C_{20}$ hydrocarbon group or a heteroatom-containing group), and they form a crosslinked structure via $A^1$ and $A^2$. In addition, $E^1$ and $E^2$ may be the same or different. Preferable examples of $E^1$ and $E^2$ include substituted cyclopentadienyl groups, indenyl groups and substituted indenyl groups.

In addition, X represents a σ-bonding or π-bonding ligand, and in the case X is plural, the plurality of X may be the same or different, and they may be crosslinked with other X, $E^1$, $E^2$ or Y. Specific examples of σ-bonding ligands include a halogen atom, a $C_1$–$C_{20}$ hydrocarbon group, an $C_1$–$C_{20}$ alkoxy group, an $C_6$–$C_{20}$ aryloxy group, a $C_1$–$C_{20}$ amide group, a $C_1$–$C_{20}$ silicon-containing group, a $C_1$–$C_{20}$ phosphide group, a $C_1$–$C_{20}$ sulfide group, a $C_1$–$C_{20}$ sulfoxide group and a $C_1$–$C_{20}$ acyl group. Examples of halogen atoms include a chlorine atom, a fluorine atom, a bromine atom and an iodine atom. Specific examples of $C_1$–$C_{20}$ hydrocarbon groups include alkyl groups such as a methyl group, ethyl group, propyl group, butyl group, hexyl group, cyclohexyl group and octyl group; alkenyl groups such as a vinyl group, propenyl group and cyclohexenyl group; arylalkyl groups such as a benzyl group, phenylethyl group and phenylpropyl group; and aryl groups such as a phenyl group, tolyl group, dimethylphenyl group, trimethylphenyl group, ethylphenyl group, propylphenyl group, biphenyl group, naphthyl group, methylnaphthyl group, anthracenyl group and phenanthrenyl group. Among these, alkyl groups such as a methyl group, ethyl group or propyl group, and aryl groups such as a phenyl group are particularly preferable. Examples of $C_1$–$C_{20}$ halogenated hydrocarbon groups include halogenated hydrocarbon groups in which the above hydrocarbon groups are substituted with a halogen atom. Among these, halogenated alkyl groups such as a trifluoromethyl group and trichloromethyl group are particularly preferable. Examples of $C_1$–$C_{20}$ alkoxy groups include alkoxy groups such as a methoxy group, ethoxy group, propoxy group and butoxy group, a phenylmethoxy group and a phenylethoxy group. Examples of $C_6$–$C_{20}$ aryloxy groups include a phenoxy group, methylphenoxy group and dimethylphenoxy group. Examples of $C_1$–$C_{20}$ amide groups include alkylamide groups such as a dimethylamide group, diethylamide group, dipropylamide group, dibutylamide group, dicyclohexylamide group and methylethylamide group, and alkenylamide groups such as a divinylamide group, dipropenylamide group and dicyclohexenylamide group; arylalkylamide groups such as a dibenzylamide group, phenylethylamide group and phenylpropylamide group; and, arylamide groups such as a diphenylamide and dinaphthylamide group. Examples of $C_1$–$C_{20}$ silicon-containing groups include mono-hydrocarbon-substituted silyl groups such as a methylsilyl group and phenylsilyl group; di-hydrocarbon-substituted silyl groups such as a dimethylsilyl group and diphenylsilyl group; tri-hydrocarbon-substituted silyl groups such as a trimethylsilyl group, triethylsilyl group, tripropylsilyl group, tricyclohexylsilyl group, triphenylsilyl group, dimethylphenylsilyl group, methyldiphenylsilyl group, tritolylsilyl group and trinaphthylsilyl group; hydrocarbon-substituted silyl ether groups such as a trimethylsilyl ether group; silicon-substituted alkyl groups such as a trimethylsilylmethyl group and phenyldimethylsilylethyl group; and, silicon-substituted aryl groups such as a trimethylsilylphenyl group. Among these, silicon-substituted alkyl group is preferable and a trimethylsilylmethyl group, phenyldimethylsilylethyl group and so forth are particularly preferable. Examples of $C_1$–$C_{20}$ sulfide groups include alkylsulfide groups such as a methylsulfide group, ethylsulfide group, propylsulfide group, butylsulfide group, hexylsulfide group, cyclohexylsulfide group and octylsulfide group, alkenylsulfide groups such as a vinylsulfide group, propenylsulfide group and cyclohexenylsulfide group; arylalkylsulfide groups such as a benzylsulfide group, phenylethylsulfide group and phenylpropylsulfide group; and arylsulfide groups such as a phenylsulfide group, tolylsulfide group, dimethylphenylsulfide group, trimethylphenylsulfide group, ethylphenylsulfide group, propylphenylsulfide group, biphenylsulfide group, naphthylsulfide group, methylnaphthylsulfide group, anthracenylsulfide group and phenanthrenylsulfide group. Examples of $C_1$–$C_{20}$ sulfoxide groups include alkylsulfoxide groups such as a methylsulfoxide group, ethylsulfoxide group, propylsulfoxide group, butylsulfoxide group, hexylsulfoxide group, cyclohexylsulfoxide group and octylsulfoxide group, alkenylsulfoxide groups such as a vinylsulfoxide group, propenylsulfoxide group and cyclohexenylsulfoxide group; arylalkylsulfoxide groups such as a benzylsulfoxide group, phenylethylsulfoxide group and phenylpropylsulfoxide group; and, arylsulfoxide groups such as a phenylsulfoxide group, tolylsulfoxide group, dimethylphenylsulfoxide group, trimethylphenylsulfoxide group, ethylphenylsulfoxide group, propylphenylsulfoxide group, biphenylsulfoxide group, naphthylsulfoxide group, methylnaphthylsulfoxide group, anthracenylsulfoxide group and phenanthrenylsulfoxide group. Examples of $C_1$–$C_{20}$ acyl groups include alkylacyl groups such as a formyl group, acetyl group, propionyl group, butyryl group, valeryl group, palmitoyl group, stearoyl group and oleoyl group; arylacyl groups such as a benzoyl group, tolyoyl group, saliciloyl group, cinnamoyl group, naphthoyl group and phthaloyl group; and, oxalyl, malonyl and succinyl groups, etc. respectively derived from carboxylic acids such as oxalic acid, malonic acid and succinic acid, etc.

Specific π-bonding ligands include compounds having a conjugated diene bond and 4–20 carbons, and compounds having a non-conjugated diene bond and 5–20 carbon atoms. Examples of compounds having a conjugated diene bond and 4–20 carbon atoms include 1,3-butadiene, isoprene, chloroprene, 1,3-heptadiene, 1,3-hexadiene, 1,3,5-hexatriene, 1,3,6-heptatriene and diphenylbutadiene. Examples of compounds having a non-conjugated diene bond and 5–20 carbons include 1,4-pentadiene and 1,5-hexadiene. These compounds are characterized by exhibiting increased activity when a π-bonding ligand is introduced for X.

Y indicates a Lewis base, and in the case Y is plural, the plurality of Y may be the same or different, and they may be cross-linked with other Y, $E^1$, $E^2$ or X. Specific examples of the Lewis base of said Y include amines, ethers, phosphines and thioethers.

Next, $A^1$ and $A^2$ are divalent cross-linking groups that bond two ligands, and indicate $C_1$–$C_{20}$ hydrocarbon groups, $C_1$–$C_{20}$ halogen-containing hydrocarbon groups, silicon-containing groups, germanium-containing groups, tin-containing groups, —O—, —CO—, —S—, —$SO_2$—, —Se——Se—, —$NR^1$—, —$PR^1$—, —$P(O)R^1$—, —$BR^1$— or —$AlR^1$—, $R^1$ indicate hydrogen atoms, halogen atoms, $C_1$–$C_{20}$ hydrocarbon groups or $C_1$–$C_{20}$ halogen-containing hydrocarbon groups, and they may be mutually the same or different. Examples of such cross-linking groups include that represented by the following general formula:

(wherein, B indicates an element of Group 14 of the Periodic Table, examples of which include carbon, silicon, germanium and tin; $R^{21}$ and $R^{22}$ respectively indicate a hydrogen atom or $C_1$–$C_{20}$ hydrocarbon group, they may be mutually the same or different, and they may mutually bond to form a ring structure; and, e indicates an integer of 1 to 4). Specific examples include a methylene group, an ethylene group, an ethylidene group, a propylidene group, a isopropylidene group, a cyclohexylidene group, a 1,2-cyclohexylene group, a vinylidene group ($CH_2$=C=), a dimethylsilylene group, a diphenylsilylene group, a methylphenylsilylene group, a dimethylgermylene group, a dimethylstanylene group, a tetramethyldisilylene group and a diphenyldisilylene group. Among these, an ethylene group, isopropylidene group and dimethylsilylene group are preferable q is an integer of 1–5 and indicates [(valency of M)–2], and r is an integer of 0–3.

In this transition metal compound represented by general formula (I), the bonding of crosslinking groups $A^1$ and $A^2$ is preferably in the form of (1,2')(2,1') double crosslinking in the case $E^1$ and $E^2$ are substituted cyclopentadienyl groups, indenyl groups or substituted indenyl groups. Among such transition metal compounds represented by general formula (I), transition metal compounds having for their ligand the double-cross-linked biscyclopentadienyl derivative represented by general formula (II):

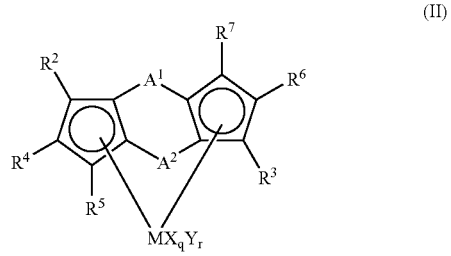

are preferable.

In the above general formula (II), M, X, Y, $A^1$, $A^2$, q and r are the same as defined in the above general formula (I). Although $R^2$ through $R^7$ respectively indicate a hydrogen atom, halogen atom, $C_1$–$C_{20}$ hydrocarbon group, $C_1$–$C_{20}$ halogen-containing hydrocarbon group, silicon-containing group or heteroatom-containing group, it is necessary that at least one of those groups not be a hydrogen atom, and preferably is a group that contains a heteroatom such as oxygen, halogen or silicon. In addition, $R^2$ through $R^7$ may be mutually the same or different, and may form a ring by mutually bonding of adjacent groups. In particular, it is preferable that $R^4$ and $R^5$ form a ring and that $R^6$ and $R^7$ form a ring. Preferable examples of $R^2$ and $R^3$ include groups that contain a heteroatom such as oxygen, halogen or silicon because of their high polymerization activity. The transition metal compounds represented by general formula (II) are preferable for the transition metal compounds represented by general formula (I), and among the transition metal compounds represented by general formula (II), those in which $R^2$ through $R^7$ are groups that contain a heteroatom are preferable. A transition metal compound represented by general formula (III) is the most preferable.

The transition metal compound having a double-crosslinkedbiscyclopentadienyl derivative for its ligand is preferably that in which the ligand is of the (1,2')(2,1') double-crosslinked type.

Specific examples of a transition metal compound represented by general formula (I) include (1,2'-ethylene)(2,1'-ethylene)bis(indenyl)zirconium dichloride, (1,2'-methylene)(2,1'-methylene)bis(indenyl)zirconium dichloride, (1,2'-isopropylidene)(2,1'-isopropylidene)bis(indenyl)zirconium dichloride, (1,2'-ethylene)(2,1'-ethylene)bis(3-methylindenyl)zirconium dichloride, (1,2'-ethylene)(2,1'-ethylene)bis(4,5-benzoindenyl)zirconium dichloride, (1,2'-ethylene)(2,1'-ethylene)bis(4-isopropylindenyl)zirconium dichloride, (1,2'-ethylene)(2,1'-ethylene)bis(5,6-dimethylindenyl)zirconium dichloride, (1,2'-ethylene)(2,1'-ethylene)bis(4,7diisopropylindenyl)zirconium dichloride, (1,2'-ethylene)(2,1'-ethylene)bis(4-phenylindenyl)zirconium dichloride, (1,2'-ethylene)(2,1'-ethylene)bis(3-methyl-4-isopropylindenyl)zirconium dichloride, (1,2'-ethylene)(2,1'-ethylene)bis(5,6-benzoindenyl)zirconium dichloride, (1,2'-ethylene)(2,1'-isopropylidene)bis(indenyl)zirconium dichloride, (1,2'-methylene)(2,1'-ethylene)bis(indenyl)zirconium dichloride, (1,2'-methylene)(2,1'-isopropylidene)bis(indenyl)zirconium dichloride, (1,2'-dimethylsilylene)(2,1'-dimethylsilylene)bis(indenyl)zirconium dichloride, (1,2'-dimethylsilylene)(2,1'-dimethylsilylene)bis(3-methylindenyl)

zirconium dichloride, (1,2'-dimethylsilylene)(2,1'-dimethylsilylene)bis(3-n-butylindenyl)zirconium dichloride, (1,2'-dimethylsilylene)(2,1'-dimethylsilylene)bis(3-i-propylindenyl)zirconium dichloride, (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-phenylindenyl)zirconium dichloride, (1,2'-dimethylsilylene)(2,1'-dimethylsilylene)bis(4,5-benzoindenyl)zirconium dichloride, (1,2'-dimethylsilylene)(2,1'-dimethylsilylene)bis(4 isopropylindenyl)zirconium dichloride, (1,2'-dimethylsilylene)(2,1'-dimethylsilylene)bis(5,6-dimethylindenyl)zirconium dichloride, (1,2'-dimethylsilylene)(2,1'-dimethylsilylene)bis(4,7-di-1-propyl-indenyl)zirconium dichloride, (1,2'-dimethylsilylene)(2,1'-dimethylsilylene)bis(4-phenylindenyl)zirconium dichloride, (1,2'-dimethylsilylene)(2,1'-dimethylsilylene)bis(3-methyl-4–1-propylindenyl) zirconium dichloride, (1,2'-dimethylsilylene)(2,1'-dimethylsilylene)bis(5,6-benzoindenyl) zirconium dichloride, (1,2'-dimethylsilylene)(2,1'-isopropylidene)bis(indenyl)zirconium dichloride, (1,2'-dimethylsilylene)(2,1'-isopropylidene)bis(3-methylindenyl)zirconium dichloride, (1,2'-dimethylsilylene)(2,1'-isopropylidene)bis(3-i-propylindenyl)zirconium dichloride, (1,2'-dimethylsilylene)(2,1'-isopropylidene)bis(3-n-butylindenyl)zirconium dichloride, (1,2'-dimethylsilylene)(2,1'-isopropylidene)bis(3-trimethylsilylmethylindenyl))zirconium dichloride, (1,2'-dimethylsilylene)(2,1'-isopropylidene)bis(3-trimethylsilylindenyl)zirconium dichloride, (1,2'-dimethylsilylene)(2,1'-isopropylidene)bis(3-phenylindenyl)zirconium dichloride, (1,2'-dimethylsilylene) (2,1'-methylene)bis(indenyl)zirconium dichloride, (1,2'-dimethylsilylene)(2,1'-methylene)bis(3-methylindenyl)zirconium dichloride, (1,2'-dimethylsilylene)(2,1'-methylene)bis(3-i-propylindenyl) zirconium dichloride, (1,2'-dimethylsilylene)(2,1'-methylene)bis(3-n-butylindenyl)zirconium dichloride, (1,2'-ethylene)(2,1'-methylene)(3-methyl cyclopentadienyl)(3'-methyl cyclopentadienyl)zirconium dichloride, (1,2'-dimethylsilylene)(2,1'-methylene)bis(3-trimethylsilylmethylindenyl)zirconium dichloride, (1,2'-diphenylsilylene)(2,1'-methylene)bis(indenyl)zirconium dichloride, (1,2'-diphenylsilylene)(2,1'-methylene)bis(3-methylindenyl)zirconium dichloride, (1,2'-diphenylsilylene)(2,1'-methylene)bis(3-i-propylindenyl)zirconium dichloride, (1,2'-diphenylsilylene)(2,1'-methylene)bis(3-n-butylindenyl) zirconium dichloride, (1,2'-diphenylsilylene) (2,1'-methylene)bis(3 trimethylsilylmethylindenyl)zirconium dichloride, (1,2'-diphenylsilylene)(2,1'-methylene)bis(3-trimethylsilylindenyl)zirconium dichloride, (1,2'-dimethylsilylene)(2,1'-dimethylsilylene) (3-methylcyclopentadienyl)(3'-m ethylcyclopentadienyl) zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl) zirconium dichloride, (1,2'-ethylene)(2,1'-isopropylidene) (3-methylcyclopentadienyl)(3'-methylcyclopentadienyl) zirconium dichloride, (1,2'-methylene)(2,1'-methylene) (3-methylcyclopentadienyl)(3'-methylcyclopentadienyl) zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl) zirconium dichloride, (1,2'-dimethylsilylene)(2,1'-dimethylsilylene)(3,4-dimethylcyclopentadienyl) (3',4'-dimethylcyclopentadienyl)zirconium dichloride, (1,2'-dimethylsilylene)(2,1'-isopropylidene)(3,4-dimethylcyclopentadienyl) (3',4'-dimethylcyclopentadienyl)zirconium dichloride, (1,2'-dimethylsilylene)(2,1'-ethylene) (3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene) (3,4dimethylcyclopentadienyl)(3',4'-dimethylcyclopentadienyl)zirconium dichloride, (1,2'-methylene)(2,1'-methylene)(3,4dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl) zirconium dichloride, (1,2'-isopropylidene)(2,1'-isopropylidene)(3,4-dimethylcyclopentadienyl) (3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-i-ethylcyclopentadienyl)(3'-methyl-5'-ethylcyclopentadienyl)zirconium dichloride, (1,2'-dimethylsilylene)(2,1'-isopropylidene)(3-methyl-5-i-propylcyclopentadienyl)(3'-methyl-5'-i-propylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl(3'-methyl-5'-ethylcyclopentadienyl)zirconium dichloride, (1,2'-dimethylsilylene)(2,1'-ethylene)(3-methyl-5-i-propylcyclopentadienyl) (3'-methyl-5'-i-propylcyclopentadienyl)zirconium dichloride, (1,2'-dimethylsilylene)(2,1'-ethylene)(3-methyl-5-n-butylcyclopentadienyl) (3'-methyl-5'-n-butylcyclopentadienyl)zirconium dichloride, (1,2'-dimethylsilylene)(2,1'-ethylene)(3-methyl-5-phenylcyclopentadienyl) (3'-methyl-5'-phenylcyclopentadienyl)zirconium dichloride, (1,2'-dimethylsilylene)(2,1'-methylene)(3-methyl-5-ethylcyclopentadienyl) (3'-methyl-5'-ethylcyclopentadienyl) zirconium dichloride, (1,2'-dimethylsilylene)(2,1'-methylene)(3-methyl-5-i-propylcyclopentadienyl)(3'-methyl-5'-i-propylcyclopentadienyl)zirconium dichloride, (1,2'-dimethylsilylene)(2,1'-methylene)(3-methyl-5-n-butylcyclopentadienyl) (3'-methyl-5'-n-butylcyclopentadienyl)zirconium dichloride, (1,2'-dimethylsilylene)(2,1'-methylene)(3-methyl-5-phenylcyclopentadienyl) (3'-methyl-5'-phenylcyclopentadienyl)zirconium dichloride, (1,2'- ethylene)(2,1'-methylene)(3-methyl-5-i-propylcyclopentadienyl)(3'-methyl-5'-i-pentacyclopentadienyl)zirconium dichloride, (1,2'-ethylene)(2,1'-isopropylidene)(3-methyl-5-i-propylcyclopentadienyl)(3'-methyl-5'-i-propylcyclopentadienyl)zirconium dichloride, (1,2'-methylene)(2,1'-methylene)(3-methyl-5-i-propylcyclopentadienyl)(3'-methyl-5'-i-propylcyclopentadienyl)zirconium dichloride, (1,2'-methylene)(2,1'-isopropylidene)(3-methyl-5-i-propylcyclopentadienyl) (3'-methyl-5'-i-propylcyclopentadienyl)zirconium dichloride, and those in which the zirconium in these compounds is substituted with titanium or hafnium. Naturally, the transition metal compound represented by general formula (I) is not limited to these examples. In addition, the transition metal compound represented by general formula (I) may also be a similar compound of a metal element of another group or member of the Lanthanoid series.

Among the transition metal compounds represented by the above general formula (II), transition metal compounds represented by general formula (III):

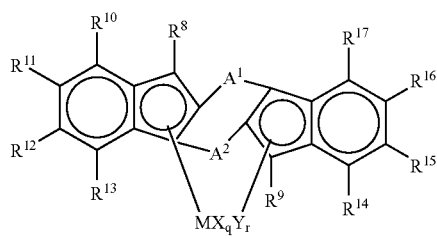

are preferable.

In the above general formula (III), M, X, Y, $A^1$, $A^2$, q and r are the same as defined in the above general formula (I). At least one of $R^8$ and $R^9$ indicate a group containing a heteroatom such as oxygen, halogen or silicon, and $R^{10}$ through $R^{17}$ indicate hydrogen atoms, $C_1$–$C_{20}$ hydrocarbon groups or groups containing a heteroatom such as oxygen, halogen or silicon. Examples of halogen atoms include a chlorine atom, fluorine atom, bromine atom and iodine atom. Examples of silicon-containing groups include $C_1$–$C_{20}$ silicon-containing groups, specific examples of which include a trimethylsilyl group, trimethylsilylmethyl group and triphenylsilyl group. Examples of heteroatom-containing groups include $C_1$–$C_{20}$ heteroatom-containing groups, specific examples of which include nitrogen-containing groups such as a dimethylamino group, diethylamino group and diphenylamino group, and sulfur-containing groups such as a phenylsulfide group and methylsulfide group; phosphorus-containing groups such as a dimethylphosphino group and diphenylphosphino group; and, oxygen-containing groups such as a methoxy group, ethoxy group and phenoxy group. Specific examples of $C_1$–$C_{20}$ hydrocarbon groups include alkyl groups such as a methyl group, ethyl group, propyl group, butyl group, hexyl group, cyclohexyl group and octyl group; arylalkyl groups such as a benzyl group, phenylethyl group and phenylpropyl group; and, alkylaryl groups such as a tolyl group and xylyl group.

Specific examples of transition metal compounds represented by the above general formula (III) include (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-ethoxymethylindenyl)zirconium dichloride, (1,2'-dimethylsilylene)(2,1'-dimethylsilylene)bis(3-ethoxyethylindenyl)zirconium dichloride, (1,2'-dimethylsilylene)(2,1'-dimethylsilylene)bis(3-methoxymethylindenyl)zirconium dichloride, (1,2'-dimethylsilylene)(2,1'-dimethylsilylene)bis(3-methoxyethylindenyl)zirconium dichloride, (1,2'-dimethylsilylene) (2,1'-isopropylidene)bis(3-trimethylsilylmethylindenyl)zirconium dichloride, (1,2'-dimethylsilylene)(2,1'-isopropylidene)bis(3-trimethylsilylindenyl)zirconium dichloride, (1,2'-dimethylsilylene)(2,1'-methylene)bis(3-trimethylsilylmethylindenyl)zirconium dichloride, (1,2'-dimethylsilylene)(2,1'-methylene)bis(3-trimethylsilylindenyl)zirconium dichloride, (1,2'-diphenylsilylene)(2,1'-methylene)bis(3-trimethylsilylmethyolindenyl) zirconium dichloride, (1,2'-diphenylsilylene)(2,1'-methylene)bis(3-trimethylsilylindenyl) zirconium dichloride, and those in which the zirconium in these compounds is substituted with titanium or hafnium. However, the transition metal compound represented by general formula (III) is not limited to these examples.

Next, although any compound can be used for component (B-1) of component (B) provided it is a compound that is able to form an ionic complex by reacting with the transition metal compound of the above component (A), compounds represented by general formulas (IV) and (V) below can be used preferably:

$$([L^1-R^{30}]_{k+})_a ([Z]^-)_b \qquad (IV)$$

$$([L^2]_{k+})_a ([Z]^-)_b \qquad (V)$$

(provided that $L^2$ is $M^2$, $R^{31}R^{32}M^3$, $R^{33}{}_3C$ or $R^{34}M^3$) [wherein (IV) and (V), $L^1$ indicates a Lewis base, $[Z]^-$ indicates non-coordinating anions, $[Z^1]^-$ and $[Z^2]^-$, where $[Z^1]^-$ is an anion in which a plurality of groups are bonded to an element, namely $[M^1G^1G^2 \ldots G^f]$ (wherein, $M^1$ indicates an element of groups 5 to 15, and preferably of groups 13 to 15, of the periodic table, $G^1$ through $G^f$ respectively represent a hydrogen atom, halogen atom, $C_1$–$C_{20}$ alkyl group, $C_2$–$C_{40}$ dialkylamino group, $C_1$–$C_{20}$ alkoxy group, $C_6$–$C_{20}$ aryl group, $C_6$–$C_{20}$ aryloxy group, $C_7$–$C_{40}$ alkylaryl group, $C_7$–$C_{40}$ arylalkyl group, $C_1$–$C_{20}$ halogen-substituted hydrocarbon group, $C_1$–$C_{20}$ acyloxy group, organic metalloid group or $C_2$–$C_{20}$ heteroatom-containing hydrocarbon group, and 2 or more of $G^1$ through $G^f$ may form a ring; and f indicates an integer equal to [(valency of central metal $M^1$)+1]); $[Z^2]^-$ indicates a conjugate base of a Bronsted acid alone or the combination of a Bronsted acid and Lewis acid, having a logarithm of the inverse of the acid dissociation constant (pKa) of –10 or less, or a conjugate base of an acid typically defined as an super-strong acid, or it may be coordinated by a Lewis base; $R^{30}$ indicates a hydrogen atom, $C_1$–$C_{20}$ alkyl group, or an aryl group, $C_6$–$C_{20}$ alkylaryl group or arylalkyl group; $R^{31}$ and $R^{32}$ respectively indicate a cyclopentadienyl group, substituted cyclopentadienyl group, indenyl group or fluorenyl group; $R^{33}$ indicates an $C_1$–$C_{20}$ alkyl group, aryl group, alkylaryl group or arylalkyl group; $R^{34}$ indicates a large ring ligand such as tetraphenylporphyrin and phthalocyanine; k indicates an integer of 1 to 3 that is the ionization number of $[L^1-R^{30}],[L^2]$; a is an integer of 1 or more; b=(k×a); $M^2$ includes an element from groups 1–3, 11–13 or 17 of the periodic table; and, $M^3$ indicates an element of groups 7–12 of the periodic table].

Here, specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline; phosphines such as triethylphosphine, triphenylphosphine and diphenylphosphine; thioethers such as tetrahydrothiophene; esters such as ethylbenzoate; and nitriles such as acetonitrile and benzonitrile.

Specific examples of $R^{30}$ include hydrogen, a methyl group, ethyl group, benzyl group and trityl group, while specific examples of $R^{31}$ and $R^{32}$ include a cyclopentadienyl group, methylcyclopentadienyl group, ethylcyclopentadienyl group and pentamethylcyclopentadienyl group. Specific examples of $R^{33}$ include a phenyl group, p-tolyl group and p-methoxyphenyl group, while examples of $R^{34}$ include tetraphenylporphyrin, phthalocyanine, allyl and methallyl. In addition, specific examples of $M^2$ include Li, Na, K, Ag, Cu, Br, I and $I_3$, while specific examples of $M^3$ include Mn, Fe, Co, Ni and Zn.

In addition, in $[Z^1]-$, namely $[M^1G^1G^2\ldots G^f]^-$, specific examples of $M^1$ include B, Al, Si, P, As and Sb, and preferably include B and Al. In addition, specific examples of $G^1$, $G^2$ through $G^f$ include dialkylamino groups such as a dimethylamino group and diethylamino group, alkoxy or aryloxy groups such as a methoxy group, ethoxy group, n-butoxy group and phenoxy group, hydrocarbon groups such as a methyl group, ethyl group, n-propyl group, isopropyl group, n-butyl group, isobutyl group, n-octyl group, n-eicosyl group, phenyl group, p-tolyl group, benzyl group, 4-t-butylphenyl group and 3,5-dimethylphenyl group, halogen atoms such as fluorine, chlorine, bromine and iodine, heteroatom-containing hydrocarbon groups such as a p-fluorophenyl group, 3,5-difluorophenyl group, pentachlorophenyl group, 3,4,5-trifluorophenyl group, pentafluorophenyl group, 3,5-bis(trifluoromethyl)phenyl group and bis(trimethysilyl)methyl group, and organic metalloid groups such as a pentamethyl antimony group, trimethylsilyl group, trimethylgermyl group, diphenylarsine group, dicyclohexylantimony group and diphenylboron.

In addition, specific examples of a non-coordinating anion, namely conjugate base $[Z^2]^-$ of a Bronsted acid alone or the combination of a Bronsted acid and Lewis acid, having a pKa of $-10$ or less, include trifluoromethanesulfonate anion $(CF_3SO_3)^-$, bis(trifluoromethanesulfonyl)methyl anion, bis(trifluoromethanesulfonyl)benzyl anion, bis(trifluoromethanesulfonyl)amide, perchlorate anion $(ClO_4)^-$, trifluoroacetate anion $(CF_3CO_2)^-$, hexafluoroantimony anion $(SbF_4)^-$, fluorosulfonate anion $(FSO_3)^-$, chlorosulfonate anion $(ClSO_3)^-$, fluorosulfonate anion/5-antimony fluoride $(FSO_3/SbF_5)^-$, fluorosulfonate anion/5-boron fluoride $(FSO_3/AsF_5)^-$, and trifluoromethanesulfonate 5-antimony fluoride $(CF_3SO_3/SbF_5)^-$.

Specific examples of ionic compounds that form an ionic complex by reacting with the transition metal compound of the above component (A), namely compounds of component (B-1), include tetraphenylborate triethylammonium, tetraphenylborate tri-n-butylammonium, tetraphenylborate trimethylammonium, tetraphenylborate tetraethylammonium, tetraphenylborate methyl (tri-n-butyl)ammonium, tetraphenylborate benzyl(tri-n-butyl)ammonium, tetraphenylborate dimethyldiphenylammonium, tetraphenylborate triphenyl (methyl)ammonium, tetraphenylborate trimethylanilinium, tetraphenylborate methylpyridinium, tetraphenylborate benzylpyridinium, tetraphenylborate methyl(2-cyanopyridinium), tetrakis(pentafluorophenyl) borate triethylammonium, tetrakis(pentafluorophenyl)borate tri-n-butylammonium, tetrakis(pentafluorophenyl)borate triphenylammonium, tetrakis(pentafluorophenyl)borate tetra-n-butylammonium, tetrakis(pentafluorophenyl)borate tetraethylammonium, tetrakis(pentafluorophenyl)borate benzyl(tri-n-butyl)ammonium, tetrakis(pentafluorophenyl) borate methyldiphenylammonium, tetrakis(pentafluorophenyl) borate triphenyl(methyl)ammonium, tetrakis(pentafluorophenyl)borate methylanilinium, tetrakis(pentafluorophenyl)borate dimethylanilinium, tetrakis(pentafluorophenyl) borate trimethylanilinium, tetrakis(pentafluorophenyl) borate methylpyridinium, tetrakis(pentafluorophenyl)borate benzylpyridinium, tetrakis(pentafluorophenyl)borate methyl (2-cyanopyridinium), tetrakis(pentafluorophenyl)borate benzyl(2-cyanopyridinium), tetrakis(pentafluorophenyl) borate methyl(4-cyanopyridinium), tetrakis(pentafluorophenyl)borate triphenylphosphonium, tetrakis [bis(3,5ditrifluoromethyl)phenyl]borate dimethylanilinium, tetraphenylborate ferrocenium, silver tetraphenylborate, trityl tetraphenylborate, tetraphenylborate tetraphenylporphyrin manganese, tetrakis(pentafluorophenyl)borate ferrocenium, tetrakis(pentafluorophenyl)borate (1,1'-dimethylferrocenium), tetrakis(pentafluorophenyl)borate decamethylferrocenium, silver tetrakis(pentafluorophenyl) borate, trityl tetrakis(pentafluorophenyl)borate, lithium tetrakis (pentafluorophenyl)borate, sodium tetrakis (pentafluorophenyl)borate, tetrakis(pentafluorophenyl) borate tetraphenylporphyrin manganese, silver tetrafluoroborate, silver hexafluorophosphate, silver hexafluoroarsenate, silver perchlorate, silver trifluoroacetate and silver trifluoromethanesulfonate.

One type of (B-1) or a combination of two or more types may be used.

On the other hand, examples of the aluminoxane of component (B-2) include the linear aluminoxane represented by general formula (VI):

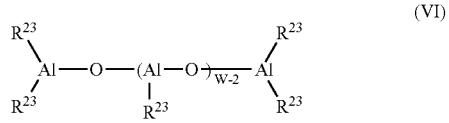

(wherein, $R^{23}$ indicates a hydrocarbon group such as a $C_1$–$C_{20}$, preferably $C_1$–$C_{12}$ alkyl group, alkenyl group, aryl group or arylalkyl group, or a halogen atom, w indicates the mean degree of polymerization, and is normally an integer from 2 to 50, and preferably an integer from 2 to 40, and each $R^{23}$ may be the same or different), and the cyclic aluminoxane represented by general formula (VII):

Although an example of the production method of the above aluminoxane includes a method wherein aluminoxane is brought in contact with a condensing agent such as water, there are no particular restrictions on the means for accomplishing this, and they may be reacted in accordance with known methods. Examples of such methods include (1) a method in which an organic aluminum compound is dissolved in an organic solvent and then brought in contact with water, (2) a method in which an organic aluminum compound is initially added during polymerization followed by the addition of water, (3) a method in which crystalline water contained in a metal salt, etc. and adsorbed water of an inorganic compound and organic compound are reacted with an organic aluminum compound, and (4) a method in which trialkylaluminum is reacted with tetraalkyldialuminoxane followed by reacting with water. Furthermore, the aluminoxane may be insoluble in toluene.

One type or a combination of two or more types of these aluminoxanes may be used.

There are no particular restrictions on the Lewis acid of component (B-3), and it may be in the form of an organic compound or solid inorganic compound. Boron compounds and aluminum compounds are used as organic compounds, while magnesium compounds and aluminum compounds are preferably used as inorganic compounds since they are able to efficiently form an active site. Examples of said aluminum compounds include bis(2,6-di-t-butyl-4-methylphenoxy) aluminum methyl and (1,1-bi-2-naphthoxy)aluminum methyl, examples of magnesium compounds include magnesium dichloride and diethoxymagnesium, examples of aluminum compounds include aluminum oxide and aluminum dichloride, and examples of boron compounds include triphenyl boron, tris(pentafluorophenyl) boron, tris([3,5-bis(trifluoromethyl)phenyl] boron, tris-[(4-fluoromethyl)phenyl] boron, trimethyl boron, triethyl boron, tri-n-butyl boron, tris(fluoromethyl) boron, tris(pentafluoroethyl) boron, tris(nonafluorobutyl) boron, tris(2,4,6-trifluorophenyl) boron, tris(3,5-difluoro) boron, tris[3,5-bis(trifluoromethyl)phenyl] boron, bis(pentafluorophenyl)fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron and n-butyldifluoroboron.

One type or a combination of two or more types of these Lewis acids may be used.

The ratio at which the above catalyst component (A) and catalyst component (B-3) are used is preferably a molar ratio of 10:1 to 1:2000, more preferably 5:1 to 1:1000, and most preferably 2:1 to 1:500. In the case of deviating from these ranges, the catalyst cost per unit weight of polymer increases, thereby making this impractical. In addition, components (B-1), (B-2) and (B-3) may be used alone or in a combination of two or more types for catalyst component (B).

The ratio at which catalyst component (A) and catalyst component (B) are used in the case of using compound (B-1) for catalyst component (B) is preferably a molar ratio of 10:1 to 1:100 and more preferably 2:1 to 1:10. In the case of deviating from the above range, the catalyst cost per unit weight of polymer increases, thus making this impractical. In addition, in the case of using compound (B-2), the molar ratio is preferably within the range of 1:1 to 1:1000000, and more preferably 1:10 to 1:10000. In the case of deviating from this range, catalyst cost per unit weight of polymer increases, thereby making this impractical. In addition, (B-1), (B-2) and (B-3) may be used along or in a combination of two or more types for catalyst component (B).

An organic aluminum compound in the form of component (C) can be used in addition to the above component (A) and component (B) for the polymerization catalyst in the production method of the present invention.

Here, a compound represented by general formula (VIII):

$$R^{36}_v AlJ_{3-v} \quad (VIII)$$

(wherein, $R^{36}$ indicates a $C_1$–$C_{10}$ alkyl group, J indicates a hydrogen atom, $C_1$–$C_{20}$ alkoxy group, $C_6$–$C_{20}$ aryl group or halogen atom, and v is an integer of 1 to 3) is used for the organic aluminum compound of component (C).

Specific examples of compound represented by the above general formula (VIII) include trimethylaluminum, triethylaluminum, triisopropylaluminum, triisobutylaluminum, dimethylaluminum dichloride, diethylaluminum dichloride, methylaluminum dichloride, ethylaluminum dichloride, dimethylaluminum fluoride, diisobutylaluminum hydride, diethylaluminum hydride and ethylaluminum sesquidichloride.

One type or a combination of two or more types of these organic aluminum compounds may be used.

In the production method of the present invention, pre-contact can also be performed using the above component (A), component (B) and component (C). In the present invention, it is preferable to use component (A') and component (A'') for component (A). Although pre-contact can be performed by bringing, for example, component (B) in contact with component (A), there are no particular restrictions on this method, and any known method can be used. This pre-contact is effect for reducing production cost as a result of improving catalytic activity, reducing the proportion of (B) used that serves as an auxiliary catalyst and so forth. In addition, by additionally bringing component (A) into contact with component (B-2), accompanying the above effects, the effect of increasing molecular weight is also observed. In addition, the pre-contact temperature is normally –20 to 200° C., preferably –10 to 150° C., and more preferably 0 to 80° C. In the case of pre-contact, an inert hydrocarbon, aliphatic hydrocarbon or aromatic hydrocarbon and so forth can be used as solvent. An aliphatic hydrocarbon is particularly preferable.

The ratios at which the above catalyst component (A) and catalyst component (C) are used in terms of molar ratio is preferably within the range of 1:1 to 1:10000, more preferably 1:5 to 1:2000 and particularly preferably 1:10 to 1:1000. As a result of using said catalyst component (C), although the polymerization activity per transition metal can be improved, if the amount of component (C) is excessively large, together with resulting in waste of the organic aluminum compound, a large amount remains in the polymer, thereby making this undesirable.

In the present invention, at least one type of catalyst component can be supported onto a suitable carrier. There are no particular restrictions on the type of said carrier, and although inorganic oxide carriers as well as other inorganic and organic carriers can be used, inorganic oxide carriers or other inorganic carriers are preferable.

Specific examples of inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and their mixtures, examples of which include silica alumina, zeolite, ferrite and glass fiber. Among these, $SiO_2$ and $Al_2O_3$ are particularly preferable. Furthermore, the above inorganic oxide carriers may contain small amounts of carbonates, nitrates, sulfates and so forth.

On the other hand, examples of other carriers include magnesium compounds represented by the general formula $MgR^{37}_x X^1_y$, and their complexes, typical examples of which include $MgCl_2$ and $Mg(OC_2H_5)_2$. Here, $R^{37}$ indicates a $C_1$–$C_{20}$ alkyl group, a $C_1$–$C_{20}$ alkoxy group or a $C_6$–$C_{20}$ aryl group, $X^1$ indicates a halogen atom or a $C_1$–$C_{20}$ alkyl group, x is 0 to 2, y is 0 to 2, and x+y=2. Each $R^{37}$ and each $X^1$ may be the same or different.

In addition, examples of organic carriers include polymers such as polystyrene, styrene-divinylbenzene copolymer, polyethylene, polypropylene, substituted polystyrene and polyarylate, as well as starch and carbon.

Preferable examples of carriers used in the present invention include $MgCl_2$, $MgCl(OC_2H_5)$, $Mg(OC_2H_5)_2$, $SiO_2$ and $Al_2O_3$. Although varying according to the type and production method, the properties of the carrier are such that the mean particle size is normally 1–300 μm, preferably 10–200 m, and more preferably 20–100 μm.

If particle size is excessively small, the amount of fine particles in the polymer increases, while if the particle size is excessively large, the amount of coarse particles in the polymer increases, causing a decrease in bulk density and clogging of the hopper. In addition, the specific surface area of the carrier is normally 1–1000 $m^2/g$ and preferably 50–500 $mg^2/g$, while pore volume is normally 0.1–5 $cm^3/g$ and preferably 0.3–3 $cm^3/g$.

If either specific surface area or pore volume deviates from the above ranges, catalyst activity may decrease. Furthermore, specific surface area and pore volume can be determined, for example, from the volume of nitrogen gas adsorbed in accordance with the BET method (see Journal of the American Chemical Society, Vol. 60, p. 309 (1983)).

Moreover, in the case the above carrier is an inorganic oxide, it is preferably used after baking normally at 150–1000° C. and preferably at 200–800° C.

In the case at least one type of catalyst component is supported onto the above carrier, at least one of catalyst component (A) and catalyst component (B), and preferably both catalyst component (A) and catalyst component (B), are supported onto the above carrier.

Although there are no particular restrictions on the method for supporting at least one of component (A) and component (B) onto said carrier, examples of methods that can be used include: (1) a method in which at least one of component (A) and component (B) is mixed with carrier, (2) a method in which, after treating the carrier with an organic aluminum compound or halogen-containing silicon compound, at least one of component (A) and component (B) is mixed in an inert solvent, (3) a method in which a support is reacted with a mixture of component (A) and/or component (B) and an organic aluminum compound or halogen-containing silicon compound, (4) a method in which component (B) or component (A) is mixed after supporting component (A) or component (B) onto a support, (5) a method in which the contact reaction product of component (A) and component (B) is mixed with a support, and (6) a method in which a support is present during a contact reaction between component (A) and component (B).

Furthermore, an organic aluminum compound of component (C) can also be added in the reactions of (4), (5) and (6) above.

In the present invention, when contacting the above components (A), (B) and (C), catalysis may be prepared by irradiating elastic wave. Examples of elastic waves include ordinary sound waves, a particularly preferable example of which is ultrasonic waves. More specifically, the elastic waves are ultrasonic waves having a frequency of 1–1000 kHz, and preferably 10–500 kHz.

A catalyst obtained in this manner may be used in polymerization after first distilling off the solvent and isolating the catalyst as a solid, or it may be used directly in polymerization.

In addition, in the present invention, a catalyst can be formed by performing the procedure of supporting at least one of component (A) and component (B) onto a carrier within the polymerization system. For example, a method can be used in which, after adding at least one of component (A) and component (B) and carrier, and further adding an organic aluminum compound of the above component (C) as necessary, an olefin such as ethylene is added at normal pressure to 2 MPa (gauge) to perform preliminary polymerization for about 1 minute to 2 hours at −20 to 200° C. and form catalyst particles.

In the present invention, the ratio of component (B-1) and carrier used in terms of weight ratio is preferably 1:5 to 1:10000 and more preferably 1:10 to 1:500. The ratio of component (B-2) and carrier used in terms of weight ratio is preferably 1:0.5 to 1:1000 and more preferably 1:1 to 1:50. In the case of using a mixture of two or more types of component (B), the ratio of each component (B) and carrier in terms of weight ratio is preferably within the above ranges. In addition, the ratio of component (A) and carrier used in terms of weight ratio is preferably 1:5 to 1:10000, and more preferably 1:10 to 1:500.

If the ratio of component (B) (component (B-1) or component (B-2)) and carrier used, or the ratio of component (A) and carrier used, deviates from the above ranges, activity may decrease. The mean particle size of the polymerization catalyst of the present invention prepared in the above manner is normally 2–200 μm, preferably 10–150 μm, and particularly preferably 20–100 μm, specific surface area is normally 20–1000 $m^2/g$ and preferably 50–500 $m^2/g$. If the mean particle size is smaller than 2 μm, the amount of fine particles in the polymer may increases, and if the mean particle size exceeds 200 μm, the amount of coarse particles in the polymer increases. If the specific surface area is less than 20 $m^2/g$, polymerization may decrease, and if the specific surface area exceeds 1000 $m^2/g$, the bulk density of the polymer may decrease. In addition, in the catalyst of the present invention, the amount of transition metal per 100 g of carrier is normally 0.05–10 g, and particularly preferably 0.1–2 g. If the amount of transition metal deviates from the above range, activity may decrease.

The supporting onto a carrier in this manner makes it possible to obtain a polymer having industrially advantageous properties including high bulk density and excellent particle size distribution.

The propylene polymer used in the present invention can be produced using the above polymerization catalyst by homopolymerization of propylene or by copolymerization of propylene and ethylene and/or α-olefin having 4–20 carbons.

In this case, there are no particular restrictions on the polymerization method, and although methods such as slurry polymerization, vapor phase polymerization, block polymerization, solution polymerization or suspension polymerization may be used, slurry polymerization and vapor phase polymerization are particularly preferable.

With respect to polymerization conditions, the polymerization temperature is normally −100 to 250° C., preferably −50 to 200° C., and more preferably 0 to 130° C. In addition, the ratio of catalyst used relative to the reaction raw material is preferably $1-10^8$, and particularly preferably $100-10^5$ for the component (A) of the raw material monomer (molar ratio). Moreover, the polymerization time is normally from 5 minutes to 10 hours, and the reaction pressure is preferably from normal pressure to 20 MPa (gauge), and more preferably from normal pressure to 10 MPa (gauge).

The molecular weight of the polymer is adjusted by selecting the types and amounts used of each catalyst component, the polymerization temperature and by polymerizing in the presence of hydrogen.

In the case of using a polymerization solvent, aromatic hydrocarbons such as benzene, toluene, xylene and ethyl-benzene, alicyclic hydrocarbons such as cyclopentane, cyclohexane and methylcyclohexane, aliphatic hydrocarbons such as pentane, hexane, heptane and octane, and halogenated hydrocarbons such as chloroform and dichloromethane can be used. Only one type of these solvents may be used alone, or a combination of two or more types may be used. In addition, a monomer of α-olefin and so forth may also be used as solvent. Furthermore, polymerization can also be carried out in the absence of solvent depending on the particular polymerization method. In polymerization, preliminary polymerization can be carried out using the above polymerization catalyst, although preliminary polymerization can be carried out by bringing a small amount of olefin, for example, into contact with a solid catalyst component, there are no particular restrictions on the method, and any known method can be used. There are no particular restrictions on the olefin used in preliminary polymerization, and although examples of such include that similar to those listed above, for example, ethylene, $C_3$–$C_{20}$ α-olefin or their mixtures, it is advantageous to use the same olefin as that used in said polymerization.

In addition, the preliminary polymerization temperature is normally −20 to 200° C., preferably −10 to 130° C. and more preferably 0 to 80° C. An inert hydrocarbon, aliphatic hydrocarbon, aromatic hydrocarbon or monomer, etc. can be used as solvent in preliminary polymerization. Among these, aliphatic hydrocarbons are particularly preferable. In addition, preliminary polymerization may also be carried out in the absence of solvent.

In preliminary polymerization, conditions should be regulated so that the intrinsic viscosity (η) of the preliminary polymerization product (as measured in decalin at 135°) is 0.2 deciliters/g or more, and particularly 0.5 deciliters/g or more, and the amount of preliminary polymerization product per 1 millimole of transition metal component of the catalyst is 1–10000 g, and particularly 10–1000 g.

[3] Propylene Resin Composition

The propylene resin composition of the present invention is a resin composition comprising the addition of nucleating agent to the above propylene polymer [1], the above propylene homopolymer [a] or the above propylene copolymer [a']. In general, crystallization of propylene polymer is comprised of two processes consisting of a crystal nucleation process and a crystal growth process. In the crystal nucleation process, the temperature difference with the crystallization temperature and the state of the orientation of the molecular chain and so forth are said to have an effect on the crystal nucleation rate. In particular, crystal nucleation rate is known to increase considerably if a substance is present that has the effect of promoting molecular chain orientation by means of adsorption of the molecular chain and so forth. The nucleating agent in the present invention should be that which has the effect of increasing the rate at which the crystal nucleation proceeds. Examples of substances having the effect of improving the rate at which the crystal nucleation proceeds include substances that have the effect of promoting molecular chain orientation by means of an adsorption process of the molecular chain by the polymer.

Specific examples of nucleating agents used in the present invention include high-melting temperature polymers, organic carboxylic acids or their metal salts, aromatic sulfonates or their metal salts, organic phosphate compounds or their metal salts, dibenzylidene sorbitol or its derivatives, rosin acid partial metal salts, inorganic fine particles, and imides, amides, quinacridones, quinones or their mixtures.

Examples of high-melting temperature include polyolefins such as polyethylene and polypropylene, polyvinylcycloalkanes such as polyvinylcyclohexane and polyvinylcyclopentane, syndiotactic polystyrenes, poly 3-methylpentene-1, poly 3-methylbutene-1 and polyalkenylsilanes.

Examples of metal salts include aluminum benzoate, aluminum p-t-butylbenzoate, sodium adipate, sodium thiophene carboxylate and sodium pyrrole carboxylate.

Examples of dibenzylidene sorbitol and its derivatives include dibenzylidene sorbitol, 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol and 1,3:2,4-dibenzylidene sorbitol. In addition, specific examples include GELOL MD and GELOL MD-R (trade names) manufactured by Shin-Nippon Rika Co., Ltd.

Examples of rosin acid partial metal salts include PINECRYSTAL KM1600, PINECRYSTAL KM1500 and PINECRYSTAL KM1300 (trade names) available from Arakawa Chemical Industries Co., Ltd.

Examples of inorganic fine particles include talc, clay, mica, asbestos, glass fibers, glass flakes, glass beads, calcium silicate, montmorillonite, bentonite, graphite, aluminum powder, alumina, silica, diatomaceous earth, titanium oxide, magnesium oxide, tephra powder, tephra balloon, aluminum hydroxide, magnesium hydroxide, basic magnesium carbonate, dolomite, calcium sulfate, potassium titanate, barium sulfate, calcium sulfite and molybdenum sulfide.

Examples of amide compounds include adipodianilide and suberodianilide.

These nucleating agents may be used alone or in combination of any two or more thereof.

As the suitable nucleating agent for the propylene resin composition of the present invention, an organophosphoric acid metal salt represented by the general formula:

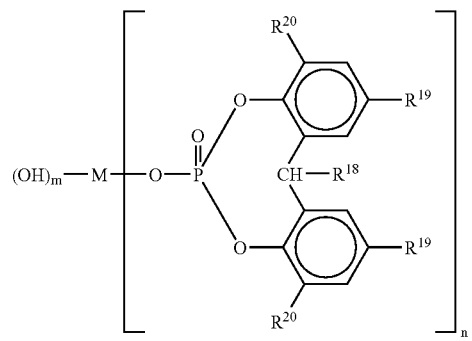

wherein $R^{18}$ is a hydrogen atom or $C_1$–$C_4$ alkyl; $R^{19}$ and $R^{20}$ are respectively a hydrogen atom, $C_1$–$C_{12}$ alkyl, cycloalkyl, aryl or aralkyl; M is a metal selected from the group consisting of alkali metals, alkali earth metals, aluminum and zinc; when M is an alkali metal, m is 0 and n is 1; when M is an alkali earth metal or zinc, n is 1 or 2 with the proviso that when n is 1, m is 1 and when n is 2, m is 0; and when M is aluminum, m is 1 and n is 2, and/or inorganic fine particles such as talc, are preferred owing to less malodor. The propylene resin composition containing as the nucleating agent, such an organophosphoric acid metal salt and/or inorganic fine particles are suitably used in food packaging applications.

Specific examples of the organophosphoric acid metal salts include ADEKASTAB NA-11 and ADEKASTAB NA-21 both available from Asahi Denka Co., Ltd.

Further, when the above inorganic particles such as talc, are used as the nucleating agent for the propylene resin composition of the present invention, films produced from such a composition are suitably improved in slip properties and printability, etc. The propylene resin composition containing the above dibenzylidene sorbitol or derivatives thereof as nucleating agents has an excellent transparency. Also, the propylene resin composition containing the above amides as nucleating agents has an excellent rigidity.

Upon the production of the propylene resin composition of the present invention, the above nucleating agents together with other optional additives may be dry-blended in the propylene polymer [1], the propylene homopolymer [a]or the propylene copolymer [a'] by a Henschel mixer or the like, or may be melt-kneaded therein by a single- or twin-screw extruder, a Banbury mixer or the like. When using the above high-melting polymers as nucleating agents, they may be added to a reactor at one time or gradually upon the production of the propylene polymer. Examples of the other optional additives include anti-oxidants, neutralizers, slipping agents, anti-blocking agents, anti-fogging agents, anti-static agents or the like.

The amount of the nucleating agent added is usually 10 ppm or higher, preferably 10 to 10,000 ppm, more preferably 10 to 5,000 ppm, still more preferably 10 to 2,500 ppm based on the propylene polymer [1], the propylene homopolymer [a]or the propylene copolymer [a']. When the amount of the nucleating agent added is less than 10 ppm, the moldability cannot be improved. Even when the amount of the nucleating agent added exceeds 10,000 ppm, there may not be produced any further favorable effect.

[4] Molded Product

The molded product of the present invention is a molded product obtained by forming the propylene polymer [1], the propylene homopolymer [a], the propylene copolymer [a'] or the propylene resin composition [3], into desired shape. The molded product of the present invention exhibits softness (also referred to as flexibility), a high elastic recovery ratio (property of returning to its original form even when pulled), less stickiness despite relatively high softness, i.e., relatively low elastic recovery ratio, and an excellent transparency.

Examples of molded products of the present invention include films, sheets, containers, automobile interior trims, housings of home appliances, or the like. Examples of the films include food packaging films, agricultural films (for use in, e.g., a plastic house) or the like. Examples of the containers include transparent cases, transparent boxes and decorative boxes because of the excellent transparency of the molded product.

Examples of molding methods of the molded product include injection molding, compression molding, injection compression molding, gas-assisted injection molding, extrusion molding, blow molding or the like.

There are no particular restrictions on the molding conditions as long as the temperature conditions allow the resin to melt and flow. The molding can usually be carried out at a resin temperature of 50–300° C. and mold temperature of 60° C. or lower.

When producing a film as the molded product of the present invention, the molding can be carried out by ordinary compression molding, extrusion molding, blow molding, cast molding and the like.

In addition, the film may or may not be stretched. In the case of stretched film, biaxial stretching is preferable. Examples of the conditions for biaxial stretching are as indicated below.

(1) Molding conditions for forming a sheet:
  Resin temperature: 50–200° C.;
  Chilled roll temperature: 50° C. or lower
(2) Longitudinal stretching conditions:
  Stretch ratio: 3–7 times;
  Stretching temperature: 50–100° C.
(3) Transverse stretching conditions:
  Stretch ratio: 6–12 times;
  Stretching temperature; 50–100° C.

In addition, the film may be surface-treated, if required, in order to increase the surface energy or polarize the film surface. Examples of the treatment methods include corona discharge treatment, chromic acid treatment, flame treatment, hot air treatment and ozone or ultraviolet irradiation treatment. Sand blasting, solvent treatment and so forth can be used as methods for roughening the surface.

The film may be blended with ordinary antioxidants, neutralizers, slipping agents, anti-blocking agents, anti-fogging agents, anti-static agents and so forth, if required.

Moreover, films containing inorganic fine particles such as talc also have excellent slipping properties and, therefore, show improved secondary processing properties such as bag-making properties, printability and the like. As a result, such films are suitable for all kinds of general-purpose packaging films that are produced using high-speed production machines such as various types of automated filling and packaging laminators.

Films produced from the propylene resin composition containing dibenzylidene sorbitol or its derivatives as the nucleating agent, have particularly excellent transparency and considerable display effects, thereby making such films suitable for the packaging of toys, writing materials and so forth.

Films produced from the propylene resin composition containing the above amide compound as the nucleating agent, have particularly excellent rigidity and are free from problems such as wrinkling in high-speed bag-making, etc., thereby making such films suitable as all kinds of general-purpose packaging films in high-speed bag-making machines.

[5] Propylene Resin Modifier

The propylene resin modifier of the present invention is a resin modifier composed of the propylene polymer [1], the propylene homopolymer [a]or the propylene copolymer [a']. The propylene resin modifier of the present invention is capable of forming a molded product having good softness, less stickiness and excellent compatibility with polyolefin resins. Namely, the propylene resin modifier of the present invention is composed of the above specific propylene homopolymer or propylene polymer. Therefore, since the resin modifier contains a slight crystalline portion especially in the polypropylene chain thereof, it has a less stickiness as compared to soft polyolefin resins as modifiers of the prior art. Moreover, the propylene resin modifier of the present invention has excellent compatibility with polyolefin resins, especially polypropylene resins. As a result, as compared to a conventional modifier in the form of ethylene-based rubber, the resin modifier of the present invention is less deteriorated in surface properties (such as stickiness), and shows a high transparency. As a result, the propylene resin modifier of the present invention is suitably used as a modifier for improving physical properties such as flexibility and transparency.

The present invention will be described in more detail by reference to the following examples. However, it should be noted that the following examples are only illustrative and not intended to limit the invention thereto.

First, the evaluation methods for resin properties and physical properties of polymers according to the present invention are explained.

(1) Measurement of [η]

The intrinsic viscosity was measured at 135° C. in tetralin using an automatic viscometer "VMR-053 Model" available from Rigosha. Co., Ltd.

(2) Measurements of Pentad Fraction, Triad Fraction and Abnormal Insertion Fraction The respective fractions were measured by the methods described in the present specification. That is, the meso pentad fraction (mmmm), the triad fractions and the racemic pentad fraction (rrrr) were respectively determined from meso and racemic fractions in pentad units in polypropylene molecular chain as well as triad fractions (m, rr, m) therein by measuring methyl signals in $^{13}$C-NMR spectra according to the method proposed by A. Zambelli et al., "Macromolecules", No. 6, p. 925 (1973). The insertion contents (m–2, 1), (r–2,1) and (1,3) were calculated from integrated intensities of respective peaks in $^{13}$C-NMR spectra which were determined to be attributed to the respective insertions according to the method reported in Grassi, et al., "Macromolecules", No. 21, p. 617 (1988) and Busico, et al., "Macromolecules", No. 27, p. 7538 (1994). Specifically, the content (m–2,1) was determined as a 2,1-meso insertion content (%) calculated from a ratio of an integrated intensity of peak attributed to Pα, γ threo observed near 17.2 ppm to that of a whole methyl carbon region; the content (r–2,1) was determined as a 2,1-racemic insertion content (%) calculated from a ratio of an integrated intensity of peak attributed to Pα, γ threo observed near 15.0 ppm to that of a whole methyl carbon region; and the content (1,3) was determined as a 1,3-insertion content (%) calculated from a ratio of an integrated intensity of peak attributed to Tβ, γ+observed near 31.0 ppm to that of a whole methyl carbon region. Meanwhile, in the case where the peaks to be attributed to 2,1-meso insertion, 2,1-racemic insertion and 1,3 insertion cannot be identified as a result of being concealed by noise and so forth, the respective insertion contents of (m$^{-2, 1}$), (r-2, 1) or (1,3) were regarded as being 0.

The $^{13}$C-NMR spectra measurement was performed using the following apparatus and conditions.

Apparatus: $^{13}$C-NMR spectrometer "JNM-EX400 Model" available from Nippon Denshi Co., Ltd.;
Method: Proton complete decoupling method;
Sample concentration: 220 mg/ml;
Solvent: mixed solvent of 1,2,4-trichlorobenzene and heavy benzene (volume ratio: 90:10);
Measuring temperature: 130° C.;
Pulse width: 45°;
Pulse repetition period: 4 seconds; and
Cumulative frequency: 10,000 times.

(3) Comonomer Unit Content in Copolymer (mol %)

The $^{13}$C-NMR spectra were measured under the following conditions using $^{13}$C-NMR spectrometer "JNM-EX400 Model" available from Nippon Denshi Co., Ltd., and then the comonomer unit contents were calculated using the method described below.

Sample concentration: 220 mg/3 ml of NMR solvent
NMR solvent: 1,2,4-trichlorobenzene/benzene-d6 (90/10 vol %)
Measuring temperature: 130° C.
Pulse width: 45°
Pulse repetition period: 10 seconds
Cumulative frequency: 4,000 times (a) Ethylene Unit The chemical shifts and attributions of respective signals of NMR spectra as measured by $^{13}$C-NMR for random copolymers of propylene and ethylene are shown in Table 1.

TABLE 1

Signal Attributions in $^{13}$C-NMR Spectra of Ethylene-Propylene Copolymers

| No. | Chemical Shift | Attributions |
|---|---|---|
| (1) | 45.1–47.3 | PPP Sαα |
| (2) | 42.3 | PPP Sαα |
| (3) | 38.6 | PPP Tαγ |
| (4) | 38.0 | Sαγ |
| (5) | 37.5 | Sαδ |
| (6) | 36.0 | PPP Sαβ |
| (7) | 36.0 | PPP Tαβ |
| (8) | 34.9 | EPP PEP Sαβ |
| (9) | 34.6 | EPP PEP Sαβ |
| (10) | 34.1 | EPP Tγγ |
| (11) | 33.7 | EEPP Tγδ |
| (12) | 33.3 | EPE Tδδ |
| (13) | 31.6 | PPP Tβγ |
| (14) | 31.4 | EPP Tβγ |
| (15) | 31.0 | PPE Tβδ |
| (16) | 30.7 | PPP Sαβ |
| (17) | 30.5 | PEEE Sγδ |
| (18) | 30.0 | EEE Sδδ |
| (19) | 29.0 | PPP Tββ |
| (20) | 27.3 | PEE Sβδ |
| (21) | 24.6 | PEP Sαβ |
| (22) | 21.3–22.7 | Pββ |
| (23) | 20.6–21.3 | Pββ |
| (24) | 19.8–20.6 | Pββ |
| (25) | 17.6 | Pαβ |
| (26) | 17.2 | Pαγ |

Note:
E represents an ethylene unit, and chemical shifts are in ppm units.

The content of ethylene unit in the copolymer ((α(mol %)) was determined from the spectra measured by $^{13}$C-NMR according to the following equation (1):

$$\alpha = E/S \times 100 \quad (1)$$

wherein S and E respectively represent:

$$S = I_{EPE} + I_{PPE} + I_{EEE} + I_{PPP} + I_{PEE} + I_{PEP}; \text{ and}$$

$$E = I_{EEE} + 2/3(I_{PEE} + I_{EPE}) + 1/3(I_{PPE} + I_{PEP})$$

wherein $$I_{EPE} = I(12);$$

$$I_{PPE} = I(15) + I(11) + (I(14) - I(11))/2 + I(10);$$

$$I_{EEE} = I(18)/2 + I(17)/4;$$

$$I_{PPP} = I(19) + (I(6) + I(7))/2 + I(3) + I(13) + I(11) + (I(14) - I(11))/2;$$

$$I_{PEE} = I(20); \text{ and}$$

$$I_{PEP} = (I(8) + I(9) - 2 \times I(11))/4 + I(21).$$

In addition, the isotactic triad fraction of the PPP chain as a stereoregularity index (P(mol %)) of the copolymer was calculated from the following equation (2):

$$P = Im/I \times 100 \quad (2)$$

wherein Im and I respectively represent:

$$Im = I(22); \text{ and}$$

$$I = I(22) + I(23) + I(24) - \{(I(8) + I(9))/2 + I(10) + 3/2 \times I(11) + I(12) + I(13) + I(15)\}$$

wherein I(1), I(2) and so forth are the respective intensities of signals (1), (2) and so forth.

(4) Measurement of Molecular Weight Distribution (Mw/Mn)

The molecular weight distribution (Mw/Mn) was measured by the method described in the present specification. That is, the value of Mw/Mn was calculated from values of weight-average molecular weight Mw and number-average molecular weight Mn in terms of polystyrene which were measured by GPC using the following apparatus and conditions:

GPC: Column: TOSO GMHHR—H(S)HT; and
　Detector: RI Detector "WATERS 150C" for liquid chromatogram,
　Measuring conditions:
　　Solvent: 1,2,4-trichlorobenzene;
　　Measuring temperature: 145° C.;
　　Flow rate: 1.0 ml/min.;
　　Sample concentration: 2.2 mg/ml;
　　Sample amount: 160 μl;
　　Calibration curve: Universal Calibration; and
　　Analytic program: HT-GPC (Ver. 10).

(5) DSC Measurement

The measurement was performed by the method described in the present specification using a differential scanning calorimeter ("DSC-7" available from Perkin Elmer Co., Ltd.) as follows.

Namely, 10 mg of a sample was melted at 230° C. for 3 minutes in a nitrogen atmosphere, and then cooled up to 0° C. at a temperature drop rate of 10° C./minute. The cooled sample was held at 0° C. for 3 minutes, and then heated at a temperature rise rate of 10° C./minute, thereby obtaining a melting endotherm ΔH. The peak top of maximum peak observed in the thus prepared melting endotherm curve was determined to be a melting temperature Tm of the sample. Further, the sample was held at 230° C. for 3 minutes, and then cooled up to 0° C. at a temperature drop rate of 10° C./minute. The crystallization exotherm curve was prepared through the above procedure. The peak top of maximum peak observed in the thus prepared crystallization exotherm curve was determined to be a crystallization temperature Tc of the sample.

(5) Temperature-Programmed Chromatography

The fraction W25 (wt %) eluted without being adsorbed in a TREF column filler at a column temperature of 25° C. in an elution curve was measured as follows.

(a) Measuring Method

A sample solution was introduced into a TREF column maintained at 135° C., and then cooled gradually down to 0° C. at a temperature drop rate of 5° C./minute. The cooled sample solution was held at 0° C. for 30 minutes so as to absorb the sample into a column filler. The column was heated to 135° C. at a temperature rise rate of 40° C./hour. The elution curve was prepared through the above procedure.

(b) Apparatus
　TREF column: Silica gel column (4.6+×150 mm) available from GL Science Co., Ltd.;
　Flow cell: KBr cell with an optical path length of 1 mm, available from GL Science Co., Ltd.;
　Feed Pump: Pump "SSC-3100" available from Senshu Scientific Co., Ltd.;
　Valve oven: Oven "MODEL 554 (high-temperature type)" available from GL Science Co., Ltd.;
　TREF oven: available from GL Science Co., Ltd.;
　Two-line temperature controller: Temperature controller "REX-C100" available from Rigaku Kogyo Co., Ltd.;
　Detector: IR Detector "MIRAN 1A CVF" for liquid chromatogram, available from FOXBORO Co., Ltd.;
　10-way valve: Electric valve available from Balco Co., Ltd.; and
　Loop: 500 μl loop available from Balco Co., Ltd.

(c) Measuring Conditions
　Solvent: o-dichlorobenzene;
　Sample concentration: 7.5 g/l;
　Sample amount: 500 μl;
　Pump discharge: 2.0 ml/min.;
　Detection wave number: 3.41 μm;
　Column filler: CHROMOSORB P (30–60 mesh); and
　Column temperature distribution: within ±0.2° C.

(7) Tensile Modulus

A test piece was prepared by press-forming propylene polymer, and subjected to tensile test according to JIS K-7113.
　Test piece (No. 2 dumbbell): thickness: 1 mm
　Cross head speed: 50 mm/min
　Load cell: 100 kg (8) Internal Haze A test piece was prepared by press-forming propylene polymer, and tested according to JIS K-7105 to measure a haze thereof. The smaller the haze value, the more excellent the transparency.
　Test piece: 15 cm×15 cm×1 mm (thickness: 1 mm)

(9) Elastic Recovery Ratio

Measurement was performed in the same manner as described in Japanese Patent Application Laid-open No. 5-132590. Namely, a JIS No. 2 dumbbell as a test piece was prepared by press-forming propylene polymer. Marks were made at 25 mm intervals in the portion of the dumbbell having a constant width, and designated as $L_0$. After stretching the test piece at the pulling speed of 50 mm/min over a distance between chucks of from 80 mm to 160 mm using a tensile tester, the distance between the chucks was returned to the initial distance at the rate of −50 mm/min, and the distance between the marks made in the dumbbell were measured after 1 minute and designated as $L_1$. The elastic recovery ratio was then calculated from the following equation. A value of zero or less indicates "no recovery."

$$[(2L_0 - L_1)/L_0] \times 100$$

wherein $L_0$ is an initial distance between marks made on dumbbell; and $L_1$ is a distance between marks made on dumbbell after stretching.

(10) Anti-Blocking Properties

After preparing test pieces by press-forming propylene polymer and adhering the test pieces to each other under the following conditions, the peel strength was measured using a tensile tester.

Test piece: 15 mm×62.5 mm×2 mm
Adhesion conditions: Adhesion temperature: 40° C., adhesion surface area: 15 mm×31 mm, pressing load: 0.7 kg, 3 hours
Shear peeling conditions: Cross head speed: 50 mm/min

(11) Izod Impact Strength

A test piece was prepared by press-forming propylene polymer, and Izod impact strength was measured according to JIS K-7110 at a test piece thickness of 3 mm and ambient temperature of −5° C.

(12) 25° C. Hexane Soluble Content (H25)

The value of H25 was measured under the following conditions.

Sample amount: 0.1–5 g;
Sample form: powder (the sample was powdered by pulverization, if pelletized)
Solvent: hexane
Elution condition: stand at 25° C. for 3 or more days; and
Calculation method: calculated from the following equation:

$$H25 = [(W_0 - W_1)/W_0] \times 100 \ (\%).$$

(13) Measurement of a Fraction Extracted with Boiling Diethyl Ether

The measurement was performed under the following conditions, using a Soxhlet extractor.

Sample amount: 1–2 g;
Sample form: powder (pelletized sample was powdered by pulverization);
Extractant: diethyl ether;
Extraction time: 10 hours;
Extraction frequency: 180 times or more; and
Calculation method: calculated from the following equation:

[Amount of a fraction extracted with diethyl ether (g)/weight of powder charged (g)]×100.

EXAMPLE 1

Propylene Homopolymer (1) Preparation of catalyst: Synthesis of (1,2'-dimethylsilylene)(2, 1'-dimethylsilylene)bis(3-n-butylindenyl) zirconium dichloride 0.83 g of (1,2'-dimethylsilylene)(2,1'-dimethylsilylene)bis(indene) (2.4 mmol) and 50 ml of ether were charged into a Schlenk's bottle. After cooling to −78° C. and adding 3.1 ml (5.0 mmol) of n-BuLi (as 1.6 M hexane solution), the mixture was stirred for 12 hours at room temperature. Then, the mixture was distilled to remove the solvent therefrom, and the obtained solids were washed with 20 ml of hexane to obtain 1.1 g (2.3 mmol) of a lithium salt as an ether adduct. The thus obtained lithium salt was dissolved in 50 ml of THF and cooled to −78° C. 0.57 ml (5.3 mmol) of n-butyl bromide was slowly dropped in the resulting solution, followed by stirring for 12 hours at room temperature. The solution is distilled to remove the solvent therefrom. The obtained residues were extracted with 50 ml of hexane, and the solvent was distilled off to obtain 0.81 g (1.77 mmol) of (1,2'-dimethylsilylene)(2,1'-dimethylsilylene)bis(3-n-butyl-indene) (yield: 74%).

Then, 0.81 g (1.77 mmol) of the obtained (1,2'-dimethylsilylene)(2,1'-dimethylsilylene)bis(3-n-butylindene) and 100 ml of ether were charged into a Schlenk's bottle under nitrogen flow. After cooling to −78° C. and adding 2.7 ml (4.15 mmol) of n-BuLi (as 1.54 M hexane solution), the mixture was stirred for 12 hours at room temperature. The mixture was then distilled to remove the solvent therefrom. The thus obtained solids were washed with hexane to obtain 0.28 g (1.43 mmol) of a lithium salt as an ether adduct.

The thus obtained lithium salt was dissolved in 50 ml of toluene under nitrogen flow. The resulting solution was cooled to −78° C., and then a toluene suspension (50 ml) containing 0.33 g (1.42 mmol) of zirconium tetrachloride previously cooled to −78° C. was dropped therein. After completion of dropping, the mixture was stirred for 6 hours at room temperature. The mixture was then filtered, and the filtrate was distilled to remove the solvent therefrom. The resulting residues were recrystallized with dichloromethane, thereby obtaining 0.2 g (0.32 mmol) of (1,2'-dimethylsilylene)(2,1'-dimethylsilylene)bis(3-n-butylindenyl)zirconium dichloride (yield: 22%).

The results of measurement by $^1$H-NMR (90 MHz, CDCl$_3$) were as follows: δ 0.88, 0.99 (12H, dimethylsilylene), 0.7–1.0, 1.1–1.5 (18H, n-Bu), 7.0–7.6 (8H, benzene ring proton).

(2) Polymerization of propylene

A 10-liter stainless steel autoclave was charged with 6 liters of heptane and 6 mmol of triisobutylaluminum (TIBA) and then with a catalyst component prepared by preliminarily contacting 5 mmol of methyl aluminoxane (available from Albemahle Co., Ltd.) with 5 μmol of the above-obtained (1,2'-dimethylsilylene)(2,1'-dimethylsilylene)bis(3-n-butylindenyl)zirconium dichloride in toluene for 5 minutes. After introducing 0.05 MPa (gauge) of hydrogen into the autoclave, propylene gas was introduced thereinto until the total pressure reached 0.8 MPa (gauge). During polymerization, propylene was continuously supplied into the autoclave through a pressure regulator such that an interior of the autoclave was maintained at a constant pressure. After the propylene was polymerized at a temperature of 50° C. for 30 minutes, the contents of the autoclave were taken out and then dried under reduced pressure to obtain propylene homopolymer. The resin properties of the resulting polymer were evaluated by the above method. The results are shown in Table 2.

(3) Blending and kneading

The following additives were blended into the polypropylene homopolymer obtained above, and the resulting mixture was extruded and granulated into pellets using a single-screw extruder (available from Tsukada Juki Seisakusho Co., Ltd.: TLC 35-20 Model).

(Additive Formulation)

Phenol-based anti-oxidant: IRGANOX 1010 available from Chiba
Specialty Chemicals: 1000 ppm
Phosphorus-based anti-oxidant: P-EPQ: 500 ppm
Neutralizer: Calcium stearate: 500 ppm
Neutralizer: DHT-4A: 500 ppm (4) Evaluation of Physical Properties Physical properties of the obtained composition were evaluated by the above methods. The results are shown in Table 2.

EXAMPLE 1A 400 ml of toluene, 0.5 mmol of TIBA and 1 mmol of methyl aluminoxane were charged into a heat-dried 1-liter autoclave at room temperature in nitrogen atmosphere. After raising the temperature to 50° C. while stirring, 1 μmol of (1,2'-dimethylsilylene)(2,1'-dimethylsilylene)bis(3-n-butyl-indenyl)zirconium dichloride was added to the autoclave. Then, propylene was supplied to the autoclave and polymerized for one hour while holding the inside pressure of the autoclave at 0.7 MPa (gauge). After completion of the polymerization reaction, the reaction product was charged into a methanol-hydrochloric acid solution, and after fully stirring, the mixture was filtered. The obtained solids were fully washed with methanol, and then dried to obtain 19.5 g of isotactic polypropylene. It was confirmed that the W25 of the resulting polymer was 90 wt %; the H25 was 15 wt %; the melting temperature (Tm) was 71.5° C.; ΔH was 13.1 J/g; the value of 3×(Tm−120) was −145.5; the mmmm fraction was 44.5 mol %; the value of rrrr/(1−mmmm) was 0.029; the rmrm fraction was 2.6 mol %; the value of mm×rr/(mr)$^2$ was 1.05; the weight average molecular weight Mw was 499,000; the molecular weight distribution Mw/Mn was 1.97; the intrinsic viscosity was 3.18 dl/g; the 2,1-insertion fraction was 0 mol %; and the 1,3-insertion fraction was 0 mol %.

EXAMPLE 2

Propylene Homopolymer

Propylene homopolymer was produced in the same manner as in EXAMPLE 1 except that no hydrogen was introduced. The results are shown in Table 2.

EXAMPLE 3

(1) Synthesis of (1,2'-dimethylsilylene)(2,1'-dimethylsilylene)bis(3-methylindenyl)zirconium dichloride 4.4 g (12.8 mmol) of (1,2'-dimethylsilylene)(2,1'-dimethylsilylene)bis(indene) and 100 ml of ether were charged into a Schlenk's bottle. After cooling to −78° C. and adding 16.1 ml (25.7 mmol) of n-BuLi (as 1.6 M hexane solution), the mixture was stirred for 12 hours at room temperature. Then, the mixture was distilled to remove the solvent therefrom. The obtained residues were washed with 20 ml of hexane to quantitatively obtain a lithium salt. The thus obtained lithium salt was dissolved in 100 ml of THF and cooled to −78° C. 7.4 g (52.0 mmol) of methyl iodide was slowly dropped in the resulting solution, followed by stirring for 12 hours at room temperature. The solution is distilled to remove the solvent therefrom. The obtained residues were extracted with 50 ml of hexane, and the solvent was distilled off to obtain 4.5 g (12 mmol) of (1,2'-dimethylsilylene)(2,1'-dimethylsilylene)bis(3-methylindene) (yield: 94%).

Then, 2.0 g (5.4 mmol) of the obtained (1,2'-dimethylsilylene)(2,1'-dimethylsilylene)bis(3-methylindene) and 100 ml of ether were charged into a Schlenk's bottle under nitrogen flow. After cooling to −78° C. and adding 13.5 ml (21.6 mmol) of n-BuLi (as 1.6 M hexane solution), the mixture was stirred for 12 hours at room temperature. The mixture was then distilled to remove the solvent therefrom. The obtained solids were washed with hexane to obtain 1.1 g (2.9 mmol) of a lithium salt. The lithium salt obtained above was dissolved in 100 ml of toluene under nitrogen flow. The resulting solution was cooled to −78° C., and a toluene suspension (100 ml) containing 0.7 g (3.0 mmol) of zirconium tetrachloride previously cooled to −78° C. was dropped therein. After completion of dropping, the mixture was stirred for 6 hours at room temperature. The mixture was then filtered, and the precipitate was extracted with dichloromethane. The resulting product was recrystallized with dichloromethane/hexane, thereby obtaining 0.5 g (0.94 mmol) of (1,2'-dimethylsilylene)(2,1'-dimethylsilylene)bis(3-methylindenyl)zirconium dichloride (yield: 32%).

The results of measurement by $^1$H-NMR (CDCl$_3$) were as follows: δ 0.95, 1.05 (12H, dimethylsilylene), 2.50 (6H, CH$_3$), 7.2–7.7 (8H, Ar—H).

(2) Homopolymerization of Propylene

A 1-liter stainless steel autoclave was charged with 400 ml of heptane and 0.5 mmol of triisobutylaluminum and then with a catalyst component prepared by preliminarily contacting 0.5 mmol of methyl aluminoxane (available from Albemahle Co., Ltd.) with 0.5 μmol of the above-obtained (1,2'-dimethylsilylene)(2,1'-dimethylsilylene)bis(3-methylindenyl)zirconium dichloride in toluene for 5 minutes. After introducing 0.03 MPa (gauge) of hydrogen into the autoclave, propylene gas was introduced thereinto until the total pressure reached 0.8 MPa (gauge). During polymerization, propylene was continuously supplied into the autoclave through a pressure regulator such that an interior of the autoclave was maintained at a constant pressure. After the propylene was polymerized at a temperature of 70° C. for 1 hour, the contents of the autoclave were taken out, and then dried under reduced pressure to obtain propylene homopolymer. The resin properties of the resulting polymer was evaluated by the above method. The results are shown in Table 2.

(3) Blending and Kneading

The same blending and kneading procedures as in EXAMPLE 1 were repeated except for using additives formulated below.

(Additive Formulation)

Phenol-based anti-oxidant: IRGANOX 1010 available from Chiba Specialty Chemicals: 1000 ppm Phosphorus-based anti-oxidant: IRGAPHOS 168 available from Chiba Specialty Chemicals: 1000 ppm (4) Evaluation of Physical Properties Evaluations were performed in the same manner as in EXAMPLE 1(4). The results are shown in Table 2.

EXAMPLE 4

Propylene Copolymer (1) Preparation of Catalyst (a) Production of (1,2'-ethylene)(2,1'-ethylene)bis(3-methylindene)

1.12 g (3.94 mmol) of (1,2'-ethylene)(2,1'-ethylene)bis(indene) was dissolved in 50 ml of dehydrated ether under nitrogen flow. The obtained solution was cooled to −78° C., and then 5.01 ml of a hexane solution containing n-butyl lithium at a concentration of 1.57 mol/l (n-butyl lithium: 7.87 mmol) was dropped into the solution for 30 minutes. Then, the temperature was raised to room temperature, and the mixture was stirred for 8 hours. The mixture was distilled under reduced pressure to remove the ether solvent therefrom, and the obtained residues were washed with hexane to obtain 1.12 g (3.02 mmol) of dilithium salt as an ether adduct. The dilithium salt was then dissolved in 50 ml of dehydrated tetrahydrofuran and cooled to −78° C. After 10 ml of a tetrahydrofuran solution containing 0.42 ml (6.74 mmol) of methyl iodide was dropped into the solution for 20 minutes, the temperature was raised to room temperature followed by stirring for 8 hours. After distilling off the solvent under reduced pressure, the residues were extracted with ethyl acetate. After washing the extract with water and drying the organic phase thereof with anhydrous magnesium sulfate, the liquid was filtered and the filtrate was dried and solidified under reduced pressure to obtain 0.87 g (2.78 mmol) of (1,2'-ethylene)(2,1'-ethylene)bis(3-methylindene) as the aimed product at a yield of 70.5%. The obtained product was in the form of a mixture of isomers being different in position of double bond in the five-membered ring from each other.

(b) Production of dilithium salt of (1,2'-ethylene)(2,1'-ethylene)bis(3-methylindene)

0.87 g (2.78 mmol) of (1,2'-ethylene)(2,1'-ethylene)bis(3-methylindene) was dissolved in 35 mmol of ether under nitrogen flow and cooled to −78° C. After 3.7 ml of a hexane solution containing n-butyl lithium at a concentration of 1.57 mol/l (n-butyl lithium: 5.81 mmol) was dropped into the solution for 30 minutes, the temperature was raised to room temperature and the mixture was stirred for 8 hours. The mixture was distilled under reduced pressure to remove the solvent therefrom, and the obtained residues were washed with hexane to obtain 1.03 g (2.58 mmol) of dilithium salt as an ether adduct at a yield of 92.8%.

The results of $^1$H-NMR measurement were as follows:
$^1$H-NMR (THF-$d_8$) (δ, ppm): 2.20 (6H, s), 3.25 (8H, s), 6.0–7.4 (8H, m)

(c) Production of (1,2'-ethylene)(2,1'-ethylene)bis(3-methylindenyl)zirconium dichloride 1.03 g (2.58 mmol) of the ether adduct of (1,2'-ethylene)(2,1'-ethylene)bis(3-methylindene) dilithium salt was suspended in 25 ml of toluene and cooled to −78° C. After adding a toluene suspension (20 ml) containing 0.60 g (2.58 mmol) of zirconium tetrachloride to the above suspension for 20 minutes, the temperature was raised to room temperature and the mixture was stirred for 8 hours, followed by filtering off the toluene supernatant therefrom. The obtained residues were then extracted twice with 50 ml of dichloromethane. After distilling off the solvent under reduced pressure, the residues were recrystallized with dichloromethane/hexane to obtain 0.21 g of (1,2'-ethylene)(2,1'-ethylene)bis(3-methylindenyl) zirconium dichloride at a yield of 17.3%.

The results of $^1$H-NMR measurement were as follows:
$^1$H-NMR (CDCl$_3$): 2.48 (6H, s), 3.33–3.85 (8H, m), 6.9–7.6 (8H, m)

(2) Copolymerization of Propylene and Ethylene 1.2 liters of toluene, 1.5 mmol of triisobutylaluminum, 10 mmol (in terms of aluminum) of methyl aluminoxane (available from Albemahle Co., Ltd.) and 20 μmol of (1,2'-ethylene)(2,1'-ethylene)bis(3-methylindenyl) zirconium dichloride were charged into a 2-liter stainless steel autoclave. The resulting mixture was heated to 30° C., and a mixed gas of ethylene and propylene (molar ratio of ethylene to propylene=1:100) was introduced thereinto. Surplus gas was discharged so as to control the total pressure in the autoclave to 0.7 MPa (gauge). After propylene and ethylene were polymerized for 60 minutes while maintaining a uniform gas composition ratio in the system, the contents were removed from the autoclave, followed by drying under reduced pressure, thereby obtaining a propylene copolymer. Procedures for blending and kneading as well as evaluation of resin properties and physical properties were performed in the same manner as in EXAMPLE 1. The results are shown in Table 2.

COMPARATIVE EXAMPLE 1

Propylene Homopolymer (1) Preparation of Magnesium Compound

After a glass reactor equipped with a stirrer having a capacity of about 6 liters was fully purged with nitrogen, about 2,430 g of ethanol, 16 g of iodine and 160 g of magnesium metal were charged into the reactor. The contents of the reactor were heated while stirring and reacted with each other under reflux until hydrogen gas was no longer generated from the reaction system to obtain a solid reaction product. The reaction solution containing the solid reaction product was dried under reduced pressure to obtain a magnesium compound.

(2) Preparation of Solid Catalyst Component (A)

160 g of the magnesium compound (uncrushed) obtained in the above step (1), 80 ml of purified heptane, 24 ml of silicon tetrachloride and 23 ml of diethyl phthalate were charged into a 5-liter glass reactor fully purged with nitrogen gas. 770 ml of titanium tetrachloride was added to the mixture while holding the temperature inside the system at 80° C. and stirring, and the contents of the reactor were reacted with each other at 110° C. for 2 hours. Then, the solid component was separated from the reaction mixture, and washed with purified heptane at 90° C. Moreover, the obtained solid component was mixed with 1,220 ml of titanium tetrachloride, and the mixture was reacted at 110° C. for 2 hours. The resulting reaction product was sufficiently washed with purified heptane to obtain a solid catalyst component (A).

(3) Vapor Phase Polymerization of Propylene

The solid catalyst component obtained in the above step (2) at a feed rate of 6.0 g/hr, triisobutyl aluminum (TIBA) at 0.2 mol/hr, 1-allyl-3,4-dimethoxybenzene (ADMB) at 0.012 mol/hr, cyclohexylmethyl dimethoxysilane (CHMDMS) at 0.012 mol/hr and propylene at 37 kg/hr were supplied to a 200-liter polymerization vessel, and polymerized at 70° C. under 2.8 MPa (gauge).

(4) Blending and Kneading 2,5-dimethyl-2,5-di-(t-butylperoxy)-hexane was mixed with the resulting polypropylene powder followed by blending with the same additives as used in EXAMPLE 1. The resulting composition was extruded into pellets using a 40 mmφ extruder.

(5) Evaluation of Resin Properties and Physical Properties

Evaluation was performed in the same manner as in EXAMPLE 1. The results are shown in Table 2.

REFERENCE EXAMPLE

Affinity PL1880

Physical properties of pellets "Affinity PL1880" (tradename) available from Dow Chemical Japan, Co., Ltd., were evaluated in the same manner as in EXAMPLE 1(4). The results are shown in Table 2.

COMPARATIVE EXAMPLE 2

Propylene Homopolymer

A 1-liter stainless steel autoclave was charged with 400 ml of heptane, 0.5 mmol of triisobutyl aluminum, and a catalyst component prepared by preliminarily contacting 2 μmol of dimethylanilinium (pentafluorophenyl)borate with 1 μmol of (tertiary butylamide) dimethyl(tetramethyl-$\eta^5$-cyclopentadienyl)silane titanium dichloride produced by the same method as in Example 1 of Japanese Patent Application Laid-open No. 3-163088, for 5 minutes in toluene. After introducing 0.03 MPa (gauge) of hydrogen into the autoclave, propylene gas was introduced thereinto until the total pressure reached 0.8 MPa (gauge). During polymerization, propylene was continuously supplied through a pressure regulator such that an interior of the autoclave was maintained at a constant pressure. After the propylene was polymerized for 1 hour at a temperature of 70° C., the contents of the autoclave were taken out, and then dried under reduced pressure to obtain a propylene homopolymer. Procedures for blending and kneading as well as evaluation of resin properties and physical properties were performed in the same manner as in EXAMPLE 1. The Results are Shown in Table 2.

EXAMPLE 5

Addition of Nucleating Agent

The same procedure as in EXAMPLE 1 was repeated except that the additives formulated below were added to the propylene homopolymer obtained in EXAMPLE 1. The results are shown in Table 3.
(Additive Formulation)
Phenol-based anti-oxidant: IRGANOX 1010 available from Chiba
Specialty Chemicals: 1000 ppm
  Phosphorus-based anti-oxidant: P-EPQ: 500 ppm
  Neutralizer: Calcium stearate: 500 ppm
  Neutralizer: DHT-4A: 500 ppm
  Nucleating agent: GELOL MD available from Shin-Nippon Rikagaku Co., Ltd.: 1000 ppm

EXAMPLE 6

Addition of Nucleating Agent

The same procedure as in EXAMPLE 5 was repeated except that the amount of GELOL MD (available from Shin-Nippon Rikagaku Co., Ltd.) added as a nucleating agent was changed to 2,000 ppm. The results are shown in Table 3.

EXAMPLE 7

Addition of Nucleating Agent

The same procedure as in EXAMPLE 1 was repeated except that the additives formulated below were added to the propylene homopolymer obtained in EXAMPLE 1. The results are shown in Table 3.
(Additive Formulation)
Phenol-based anti-oxidant: IRGANOX 1010 available from Chiba
Specialty Chemicals: 1000 ppm
  Phosphorus-based anti-oxidant: IRGAHPOS 168 available from Chiba
Specialty Chemicals: 1000 ppm
  Nucleating agent: GELOL MD available from Shin-Nippon Rikagaku Co., Ltd.: 5000 ppm

EXAMPLE 8

Addition of Nucleating Agent

The same procedure as in EXAMPLE 7 was repeated except that the amount of GELOL MD (available from Shin-Nippon Rikagaku Co., Ltd.) added as a nucleating agent was changed to 1,000 ppm. The results are shown in Table 3.

EXAMPLE 9

Addition of Nucleating Agent

The same procedure as in EXAMPLE 7 was repeated except that 2,000 ppm of NA-11 available from Asahi Denka Co., Ltd. was used in place of 5,000 ppm of GELOL MD (available from Shin-Nippon Rikagaku Co., Ltd.) as a nucleating agent. The results are shown in Table 3.

EXAMPLE 10

Effect of Addition of Modifier 70 wt % of the pellets obtained in EXAMPLE 1 were blended in Polypropylene E105GM (available from Idemitsu Petrochemicals, Co., Ltd.), and the resulting blended mixture was extruded and granulated into pellets using a single-screw extruder ("TLC35-20 Model" available from Tsukada Juki Seisakusho Co., Ltd.). Procedures for evaluation of physical properties were performed in the same manner as in EXAMPLE 1(4). The results are shown in Table 4.

EXAMPLE 11

Effect of Addition of Modifier

The same procedure as in EXAMPLE 10 was repeated except that the pellets obtained in EXAMPLE 1 were blended in an amount of 60 wt %. The results are shown in Table 4.

EXAMPLE 12

Effect of Addition of Modifier

The same procedure as in EXAMPLE 10 was repeated except that the pellets obtained in EXAMPLE 1 were blended in an amount of 30 wt %.
The results are shown in Table 4.

COMPARATIVE EXAMPLE 3

Physical properties of Polypropylene "E105GM" (available from Idemitsu Petrochemicals, Co., Ltd.) were evaluated by the same method as in EXAMPLE 1(4). The results are shown in Table 4.

COMPARATIVE EXAMPLE 4

The same procedure as in EXAMPLE 10 was repeated except that the polymer obtained in COMPARATIVE EXAMPLE 2 was blended in an amount of 50 wt % into Polypropylene "E105GM" (available from Idemitsu Petrochemicals, Co., Ltd.). The results are shown in Table 4.

EXAMPLE 13

Propylene Homopolymer

A 1-liter stainless steel pressure autoclave equipped with a stirrer was heated to 80° C., fully dried under reduced pressure, returned to atmospheric pressure by introducing dry nitrogen thereinto, and then cooled to room temperature. 400 ml of dry deoxygenated heptane and 0.5 ml of a 2.0 M heptane solution of triisobutyl aluminum (1.0 mmol) were charged into the autoclave under dry nitrogen flow, followed by stirring at 350 rpm for a while. Then, a 50 ml Schlenk's tube fully purged with nitrogen was charged with 10 ml of cyclohexane and 0.5 ml of a 2 M heptane solution of triisobutyl aluminum (1.0 mmol) and then with 1.0 ml of a 4 M cyclohexane solution of dimethylanilinium tetrakis (pentafluorophenyl)borate (4.0 mmol) and 4 μmol of (1,2'-dimethylsilylene)(2,1'-dimethylsilylene)bis(3-n-butylindenyl) zirconium dichloride obtained in EXAMPLE 1, followed by stirring for 60 minutes at room temperature. The resulting catalyst slurry was quickly charged into the autoclave. Then, hydrogen was introduced into the autoclave until reaching 0.03 MPa (gauge). Subsequently, the contents of the autoclave were stirred at 400 rpm, and propylene was slowly introduced until the total pressure thereof reached 0.8 MPa (gauge) while simultaneously slowly raising the temperature to 50° C. The propylene was polymerized for 30 minutes.

After completion of the polymerization reaction, unreacted propylene was removed by depressurization. The reaction mixture was charged into 2 liters of methanol to precipitate polypropylene. Then, the reaction mixture was filtered, and the resulting residue was dried to obtain polypropylene. The obtained polypropylene was evaluated by the same method as in EXAMPLE 1. The Results are Shown in Table 5.

EXAMPLE 14

Propylene Homopolymer

A 1 liter stainless steel pressure autoclave equipped with a stirrer was heated to 80° C., fully dried under reduced pressure, returned to atmospheric pressure by introducing dry nitrogen thereinto, and then cooled to room temperature. 400 ml of dry deoxygenated heptane, 1.0 ml of a 2.0 M heptane solution of triisobutyl aluminum (2.0 mmol) and 0.8 ml of a heptane slurry (2.0 μmol/ml) of dimethylanilinium tetrakis (pentafluorophenyl) borate (1.6 μmol) were charged into the autoclave under dry nitrogen flow, followed by stirring for 5 minutes at room temperature at 350 rpm. Subsequently, the resulting mixture was mixed with 4 μmol of the above-obtained (1,2'-dimethylsilylene)(2,1'-dimethylsilylene)bis(3-n-butylindenyl)zirconium dichloride, and then hydrogen was introduced into the autoclave until reaching 0.03 MPa (gauge). Then, the contents of the autoclave were stirred at 400 rpm, and propylene was slowly introduced until the total pressure thereof reached 0.8 MPa (gauge) while simultaneously slowly raising the temperature to 50° C. The propylene was polymerized for 30 minutes. After completion of the polymerization reaction, unreacted propylene was removed by depressurization. The reaction mixture was charged into 2 liters of methanol to precipitate polypropylene. Then, the reaction mixture was filtered, and the resulting residue was dried to obtain polypropylene. The obtained polypropylene was evaluated by the same method as in EXAMPLE 1. The results are shown in Table 5.

EXAMPLE 15

(1) Synthesis of (1,2'-dimethylsilylene)(2,1'-dimethylsilylene)bis(3-trimethylsilylmethylindenyl)zirconium dichloride 3.0 g (6.97 mmol) of a lithium salt of (1,2'-dimethylsilylene)(2,1'-dimethylsilylene)bis(indene) was dissolved in 50 ml of THF in a Schlenk's bottle and cooled to −78° C. 2.1 ml (14.2 mmol) of iodomethyltrimethylsilane was slowly dropped in the solution and stirred for 12 hours at room temperature. The resulting mixture was distilled to remove the solvent therefrom, and the obtained residues were mixed with 50 ml of ether and washed with saturated ammonium chloride solution. After separating the liquid from the mixture, the organic phase was dried to remove the solvent therefrom to obtain 3.04 g (5.88 mmol) of (1,2'-dimethylsilylene)(2,1'-dimethylsilylene)bis(3-trimethylsilylmethylinden e) (yield: 84%).

Next, 3.04 g (5.88 mmol) of the thus obtained (1,2'-dimethylsilylene)(2,1'-dimethylsilylene)bis(3-trimethylsilylmethylindene) and 50 ml of ether were charged into a Schlenk's bottle under nitrogen flow. After cooling to −78° C. and adding 7.6 ml (11.7 mmol) of n-BuLi (as 1.54 M hexane solution), the mixture was stirred for 12 hours at room temperature. Then, the mixture was distilled to remove the solvent therefrom, and the obtained solids were washed with 40 ml of hexane to obtain 3.06 g (5.07 mmol) of a lithium salt as an ether adduct (yield: 73%).

The results of measurement by $^1$H-NMR (90 MHz, THF-$d_8$) were as follows: δ 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2–7.7 (m, 8H, Ar—H).

The thus obtained lithium salt was dissolved in 50 ml of toluene under nitrogen flow. The solution was cooled to −78° C., and a toluene suspension (20 ml) containing 1.2 g (5.1 mmol) of zirconium tetrachloride preliminarily cooled to −78° C. was dropped into the solution. After completion of dropping, the mixture was stirred for 6 hours at room temperature. The reaction solution was then distilled to remove the solvent therefrom. The resulting residues were recrystallized with dichloromethane to obtain 0.9 g (1.33 mmol) of (1,2'-dimethylsilylene)(2,1'-dimethylsilylene)bis (3-trimethylsilylmethylindenyl)zirconium dichloride (yield: 26%).

The results of measurement by $^1$H-NMR (90 MHz, CDCl$_3$) were as follows: δ 0.0 (s, 18H, trimethylsilyl), 1.02, 1.12 (s, 12H, dimethylsilylene), 2.51 (dd, 4H, methylene), 7.1–7.6 (m, 8H, Ar—H).

(2) Homopolymerization

The same polymerization procedure as in EXAMPLE 1 (2) was repeated except for using (1,2'-dimethylsilylene)(2, 1'-dimethylsilylene)bis(3-trimethylsilylmethylindenyl)zirconium dichloride instead of (1,2'-dimethylsilylene)(2,1'-dimethylsilylene)bis(3-n-butylindenyl)zirconium dichloride. The obtained polymer was evaluated by the same method as in EXAMPLE 1. The Results are Shown in Table 5.

EXAMPLE 15A 400 ml of toluene, 0.5 mmol of TIBA and 0.5 mmol of methyl aluminoxane were charged into a heat-dried 1-liter autoclave at room temperature under nitrogen flow. After raising the temperature to 50° C. while stirring, 0.5 μmol of (1,2'-dimethylsilylene)(2,1'-dimethylsilylene)bis(3-trimethylsilylmethylindenyl)zirconium dichloride was added to the autoclave. Then, propylene was supplied to the autoclave and polymerized for one hour while holding the inside pressure of the autoclave at 0.7 MPa (gauge). After completion of the polymerization reaction, the reaction product was charged into a methanol-hydrochloric acid solution and after fully stirring, the mixture was filtered. The obtained solids were fully washed with methanol and then dried to obtain 70.1 g of isotactic polypropylene. It was confirmed that the W25 value of the resulting polymer was 92 wt %, the H25 value was 16 wt %, the melting temperature (Tm) was 73.5° C., ΔH was 5.2 J/g, the value of 3×(Tm-120) was −139.5, the mmmm fraction was 39.8 mol %, the value of rrrr/(1−mmmm) was 0.032, the rmrm fraction was 2.6 mol %, the value of mm×rr/(mr)$^2$ was 1.33, the weight average molecular weight Mw was 664,000, the molecular weight distribution Mw/Mn was 2.46, the intrinsic viscosity was 3.39 dl/g, the 2,1-insertion fraction was 0 mol %, and the 1,3-insertion fraction was 0 mol %.

EXAMPLE 16

(1) Synthesis of (1,2'-dimethylsilylene)(2,1'-dimethylsilylene)bis(3-ethoxymethylindenyl)zirconium dichloride 4.1 g (9.50 mmol) of a lithium salt of (1,2'-dimethylsilylene)(2,1'-dimethylsilylene)bis(indene) was dissolved in 50 ml of THF in a Schlenk's bottle and cooled to −78° C. 1.9 ml (20.5 mmol) of chloromethyl ethyl ether were slowly dropped into the solution and stirred for 12 hours at room temperature. The resulting mixture was distilled to remove the solvent therefrom, and the obtained residues were mixed with 50 ml of ether and hydrolyzed with saturated ammonium chloride solution. After separating the liquid from the mixture, the organic phase was dried to remove the solvent therefrom to obtain 3.43 g (7.40 mmol) of (1,2'-dimethylsilylene)(2,1'-dimethylsilylene)bis(3-ethoxymethylindene) (yield: 78%).

Next, 3.43 g (7.40 mmol) of the thus obtained (1,2'-dimethylsilylene)(2,1'-dimethylsilylene)bis(3-ethoxymethylindene) and 50 ml of ether were charged into a Schlenk's bottle under nitrogen flow. After cooling to −78° C. and adding 9.4 ml (14.8 mmol) of n-BuLi (as 1.57 M hexane solution), the mixture was stirred for 12 hours at room temperature. Then, the mixture was distilled to remove the solvent therefrom, and the obtained solids were washed with 50 ml of hexane to obtain 1.07 g (1.96 mmol) of a lithium salt as an ether adduct (yield: 26%). The thus obtained lithium salt was then dissolved in 50 ml of toluene under nitrogen flow. The solution was cooled to −78° C., and a toluene suspension (20 ml) of 0.46 g (1.96 mmol) of zirconium tetrachloride preliminarily cooled to −78° C. was dropped into the solution. After completion of dropping, the mixture was stirred for 6 hours at room temperature. The reaction solution was then distilled to remove the solvent therefrom. The resulting residues were extracted with 40 ml of hexane to obtain 0.24 g (0.39 mmol) of (1,2'-dimethylsilylene)(2,1'-dimethylsilylene)bis(3-ethoxymethylindenyl) zirconium dichloride (yield: 20%).

(2) Homopolymerization

The same polymerization procedure as in EXAMPLE 1 (2) was repeated except for using (1,2'-dimethylsilylene)(2,1'-dimethylsilylene)bis(3-ethoxymethylindenyl)zirconium dichloride instead of (1,2'-dimethylsilylene)(2,1'-dimethylsilylene)bis(3-n-butylindenyl)zirconium dichloride. The obtained polymer was evaluated by the same method as in EXAMPLE 1. The results are shown in Table 5.

EXAMPLE 16A

The same procedure as in EXAMPLE 1A was repeated except for using (1,2'-dimethylsilylene)(2,1'-dimethylsilylene)bis(3-ethoxymethylindenyl) zirconium dichloride instead of (1,2'-dimethylsilylene)(2,1'-dimethylsilylene)bis(3-n-butylindenyl)zirconium dichloride, to obtain 36.4 g of isotactic polypropylene. It was confirmed that the W25 value of the resulting polymer was 91 wt %, the H25 value was 16 wt %, the melting temperature (Tm) was 72.2° C., ΔH was 3 J/g, the value of 3×(Tm-120) was −143.4, the mmmm fraction was 41.9 mol %, the value of rrrr/(1−mmmm) was 0.040, the rmrm fraction was 3.7 mol %, the value of mm×rr/(mr)$^2$ was 1.24, the weight average molecular weight Mw was 595,000, the molecular weight distribution Mw/Mn was 4.87, the intrinsic viscosity was 3.33 dl/g, the 2,1-insertion fraction was 0 mol %, and the 1,3-insertion fraction was 0 mol %.

COMPARATIVE EXAMPLE 5

(1) Synthesis of Complex

Bis(2-phenylindenyl)zirconium dichloride was synthesized according to the method described in "Science", 267, 217 (1995).

(2) Homopolymerization

A 1-liter stainless steel pressure autoclave equipped with a stirrer was heated to 80° C., fully dried under reduced pressure, returned to atmospheric pressure by introducing dry nitrogen thereinto, and then cooled to room temperature. 400 ml of dry deoxygenated heptane and 1.0 ml of a 2.0 M heptane solution of triisobutyl aluminum (2.0 mmol) were charged into the autoclave under dry nitrogen flow, followed by stirring at 350 rpm for a while. A toluene slurry of methyl aluminoxane (2.04 mmol/ml, 4.0 ml, 8 mmol) and a heptane slurry of the above-obtained bis(2-phenylindenyl)zirconium dichloride (10 μmol/ml, 0.8 ml, 8.0 μmol) were added to the autoclave. Subsequently, the contents of the autoclave were stirred at 400 rpm, and propylene was slowly introduced until the total pressure thereof reached 0.8 MPa (gauge) while simultaneously slowly raising the temperature to 30° C. The propylene was polymerized for 60 minutes. After completion of the polymerization reaction, unreacted propylene was removed by depressurization. The reaction solution was charged into a vat, air-dried overnight and then dried under reduced pressure at 60° C. to obtain polypropylene. The resulting polypropylene was evaluated by the same method as in EXAMPLE 1. The results are shown in Table 5.

COMPARATIVE EXAMPLE 6

(1) Synthesis of Complex

[1-(9-fluorenyl)-2-(1-(5,6-cyclopenta-2-methyl-1-indenyl)ethane)] zirconium dichloride was synthesized according to the method described in WO 99/52950.

(2) Homopolymerization

A 1-liter stainless steel pressure autoclave equipped with a stirrer was heated to 80° C., fully dried under reduced pressure, returned to atmospheric pressure by introducing dry nitrogen thereinto, and then cooled to room temperature. 400 ml of dry deoxygenated toluene and 1.0 ml of a 2.0 M heptane solution of triisobutyl aluminum (2.0 mmol) were charged into the autoclave under dry nitrogen flow, followed by stirring at 350 rpm for a while. A toluene slurry of methyl aluminoxane (2.04 mmol/ml, 4.0 ml, 8 mmol) and a heptane slurry of the above-obtained rac-[1-(9-fluorenyl)-2-(1-(5,6-cyclopenta-2-methyl-1-indenyl)ethane)] zirconium dichloride (10 μmol/ml, 0.8 ml, 8.0 μmol) were added to the autoclave. Subsequently, the contents of the autoclave were stirred at 400 rpm, and the propylene was slowly introduced until the total pressure thereof reached 0.8 MPa (gauge) while simultaneously slowly raising the temperature to 30° C. The propylene was polymerized for 60 minutes. After completion of the polymerization reaction, unreacted propylene was removed by depressurization. The reaction solution was charged into a vat, air-dried overnight and then dried under reduced pressure at 60° C. to obtain polypropylene. The resulting polypropylene was evaluated by the same method as in EXAMPLE 1. The results are shown in Table 5.

TABLE 2-1

| Item | Ex. 1 | Ex. 2 | Ex. 3 | Ex. 4 |
|---|---|---|---|---|
| Comonomer content mol % | — | — | — | 10 |
| W25 wt % | 93 | 90 | 80 | 56 |
| H25 wt % | 17 | 15 | 15 | 42 |
| Tm ° C. | n.d. | n.d. | 70 | 76 |
| ΔH J/g | n.d. | n.d. | 7 | 19 |
| 3 × (Tm-120) | n.d. | n.d. | −150 | −132 |
| mmmm fraction mol % | 41 | 41 | 46 | — |
| P mol % | — | — | — | 76 |
| rrrr/(1−mmmm) | 0.04 | 0.04 | 0.04 | — |
| rmrm fraction mol % | 3.2 | 3.2 | 2.6 | — |
| mm × rr/(mr)$^2$ | 1.2 | 1.2 | 1.3 | — |
| Mw/Mn | 2.4 | 2.0 | 2.5 | 6.1 |
| [η] dl/g | 2.5 | 4.4 | 4.4 | 0.7 |
| 2,1-insertion fraction mol % | 0 | 0 | 0 | — |
| 1,3-insertion fraction mol % | 0 | 0 | 0 | — |
| Boiling diethyl ether extraction amount wt % | 30 | 29 | 25 | 56 |
| Tc ° C. | n.d. | n.d. | n.d. | 18 |
| Tensile modulus MPa | 31 | 34 | 52 | 60 |
| Internal haze % | 4 | 3 | 4 | 10 |
| Elastic recovery ratio % | 69 | 78 | 33 | 28 |
| Anti-blocking properties kg/cm$^2$ | 5 | 5 | 4 | 6 |
| Izod impact strength kJ/m$^2$ | 2.8 | 3.4 | 2.5 | 5.0 | n.d.: Not determined
Izod impact strength: With notch, measured at −5° C.

TABLE 2-2

| Item | Comp Ex. 1 | Comp. Ex. 2 | Ref. Ex. |
|---|---|---|---|
| Comonomer content mol % | — | — | — |
| W25 wt % | 30 | 99 | — |
| H25 wt % | 6 | 100 | — |
| Tm ° C. | 159 | n.d. | — |
| ΔH J/g | 61 | n.d. | — |
| 3 × (Tm-120) | 117 | n.d. | — |
| mmmm fraction mol % | 65 | 2 | — |
| P mol % | — | — | — |
| rrrr/(1−mmmm) | 0.23 | 0.114 | — |
| rmrm fraction mol % | 1.4 | 15.3 | — |
| mm × rr/(mr)$^2$ | 6.1 | 0.2 | — |
| Mw/Mn | 2.7 | 2.2 | — |
| [η] dl/g | 2.1 | 1.9 | — |
| 2,1-insertion fraction mol % | 0 | 4.4 | — |
| 1,3-insertion fraction mol % | 0 | 0 | — |
| Boiling diethyl ether extraction amount wt % | 12 | 63 | — |
| Tc ° C. | 104 | n.d. | — |
| Tensile modulus MPa | 330 | 2 | 85 |
| Internal haze % | 60 | 4 | 10 |
| Elastic recovery ratio % | No recovery | 79 | No recovery |
| Antiblocking properties kg/cm$^2$ | 0 | No peeling | 3 |
| Izod impact strength kJ/m$^2$ | 2.1 | 4.3 | Not ruptured | n.d.: Not determined
Izod impact strength: With notch, measured at −5° C.

TABLE 3-1

| Item | Ex. 1 | Ex. 5 | Ex. 6 |
|---|---|---|---|
| Nucleating agent | — | Gelall MD | Gelall MD |
| Amount of nucleating agent added ppm | — | 1000 | 2000 |
| Tm ° C. | n.d. | n.d. | 64 |
| Tc ° C. | n.d. | n.d. | n.d. |
| Tensile modulus MPa | 30 | 32 | 35 |
| Internal haze % | 4 | 5 | 5 |
| Elastic recovery ratio % | 69 | 70 | 72 |
| Izod impact strength kJ/m$^2$ | 2.8 | 3.2 | 2.9 |

Izod impact strength: With notch, measured at −5° C.

TABLE 3-2

| Item | Ex. 7 | Ex. 8 | Ex. 9 |
|---|---|---|---|
| Nucleating agent | Gelall MD | Gelall MD | NA-11 |
| Amt. of nucleating agent added ppm | 5000 | 10000 | 2000 |
| Tm ° C. | 65 | 64 | 64 |
| Tc ° C. | n.d. | n.d. | n.d. |
| Tensile modulus MPa | 41 | 42 | 32 |
| Internal haze % | 5 | 4 | 5 |
| Elastic recovery ratio % | 75 | 76 | 76 |
| Izod impact strength kJ/m$^2$ | 5.0 | 2.9 | 7.1 |

Izod impact strength: With notch, measured at −5° C.

TABLE 4-1

| Item | Ex. 10 | Ex. 11 | Ex. 12 |
|---|---|---|---|
| Tensile modulus MPa | 190 | 230 | 560 |
| Internal haze % | 33 | 43 | 54 |
| Elastic recovery ratio % | 20 | 1 | No recovery |
| Izod impact strength kJ/m$^2$ | 2.5 | 2.4 | 1.9 |

Izod impact strength: With notch, measured at −5° C.

TABLE 4-2

| Item | Comp. Ex. 1 | Comp. Ex. 3 | Comp. Ex. 4 |
|---|---|---|---|
| Tensile modulus MPa | 330 | 1500 | 240 |
| Internal haze % | 60 | 44 | 71 |

TABLE 4-2-continued

| Item | Comp. Ex. 1 | Comp. Ex. 3 | Comp. Ex. 4 |
|---|---|---|---|
| Elastic recovery ratio % | No recovery | No recovery | No recovery |
| Izod impact strength kJ/m² | 2.1 | 1.9 | 1.6 |

Izod impact strength: With notch, measured in −5° C.

TABLE 5-1

| Item | Ex. 13 | Ex. 14 | Ex. 15 | Ex. 16 |
|---|---|---|---|---|
| Comonomer content mol % | — | — | — | — |
| W25 wt % | 91 | 90 | 90 | 91 |
| H25 wt % | 14 | 15 | 16 | 15 |
| Tm ° C. | n.d. | n.d. | n.d. | n.d. |
| ΔH J/g | n.d. | n.d. | n.d. | n.d. |
| 3 × (Tm-120) | n.d. | n.d. | n.d. | n.d. |
| mmmm fraction mol % | 42 | 42 | 42 | 44 |
| P mol % | — | — | — | — |
| rrrr/(1−mmmm) | 0.04 | 0.04 | 0.04 | 0.04 |
| rmrm fraction mol % | 3.0 | 3.2 | 3.2 | 2.6 |
| mm × rr/(mr)² | 1.2 | 1.2 | 1.2 | 1.3 |
| Mw/Mn | 2.3 | 2.4 | 2.5 | 2.4 |
| [η] dl/g | 1.3 | 1.3 | 2.3 | 2.5 |
| 2,1-insertion fraction mol % | 0 | 0 | 0 | 0 |
| 1,3-insertion fraction mol % | 0 | 0 | 0 | 0 |
| Boiling diethyl ether extraction amount wt % | 28 | 27 | 26 | 28 |
| Tc ° C. | n.d. | n.d. | n.d. | 18 |
| Tensile modulus MPa | 35 | 36 | 37 | 35 |
| Internal haze % | 3 | 4 | 4 | 3 |
| Elastic recovery ratio % | 68 | 67 | 70 | 69 |
| Anti-blocking properties kg/cm² | 4 | 5 | 5 | 4 |
| Izod impact strength kJ/m² | 3.2 | 3.0 | 3.5 | 3.4 | n.d.: Not determined
Izod impact strength: With notch, measured at −5° C.

TABLE 5-2

| Item | Comp. Ex. 5 | Comp. Ex. 6 |
|---|---|---|
| Comonomer content mol % | — | — |
| W25 wt % | 99 | 98 |
| H25 wt % | 50 | 25 |
| Tm ° C. | 142.0 | 121.2 |
| ΔH J/g | 5.5 | 1.1 |
| 3 × (Tm-120) | 66 | −3.3 |
| mmmm fraction mol % | 27 | 36 |
| P mol % | — | — |
| rrrr/(1−mmmm) | 0.04 | 0.05 |
| rmrm fraction mol % | 9.7 | 1.1 |
| mm × rr/(mr)² | 0.4 | 1.5 |
| Mw/Mn | 2.8 | 2.5 |
| [η] dl/g | 1.22 | 1.44 |
| 2,1-insertion fraction mol % | 0 | 0 |
| 1,3 insertion fraction mol % | 0 | 0 |
| Boiling diethyl ether extraction amount wt % | — | — |
| Tc ° C. | — | — |
| Tensile modulus MPa | 8 | 26 |
| Internal haze % | 20.6 | 15.3 |
| Elastic recovery ratio % | 88 | 93 |
| Antiblocking properties kg/cm² | No peeling | 5 |
| Izod impact strength kJ/m² | 2.3 | 2.9 |

Izod impact strength: With notch, measured in −5° C.

INDUSTRIAL APPLICABILITY

The propylene polymer, propylene homopolymer, propylene copolymer and resin composition and molded product composed of the polymers have a less stickiness as well as excellent softness and transparency, and are suitable for use in films, sheets, containers, automobile interior trims housings of home appliances, and so forth. Examples of films include food packaging films and agricultural films, and examples of containers include transparent cases, transparent boxes and decorative boxes. In addition, they can also be used as alternatives to soft vinyl dichloride resin. The propylene resin modifier of the present invention is capable of forming molded products that are soft, and have a less stickiness and excellent compatibility with polyolefin resin.

What is clamed is:

1. A propylene homopolymer satisfying:
   (1) a 25° C. hexane soluble content (H25) of 0–80 wt %;
   (2) neither a melting temperature (Tm) nor a melting endotherm (ΔH) measurable by differential scanning calorimetry (DSC);
   (3 a mesopentad fraction (mmmm) of 30–60 mol %:
   (4) a racemic pentad fraction (rrrr) satisfying the following relationship:

$\{rrrr/(1-mmmm)\} \leq 0.1$;

(5) a fraction (W25) eluted at a temperature up to 25° C. by temperature programmed chromatography, of from 20–100 wt %; and
   (6) a pentad fraction (rmrm) of more than 2.5 mol %.

2. The propylene homopolymer according to claim 1, satisfying the following relationship:

$(mm) \times (rr)/(mr)^2 \leq 2.0$ wherein (mm) is a meso triad fraction; (rr) is a racemic triad fraction; and (mr) is a triad fraction.

3. The propylene homopolymer according to claim 1 produced by polymerizing propylene in the presence of a polymerization catalyst containing:
   (A) a transition metal compound represented by the general formula (I):

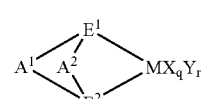

wherein M is a metal element of Groups 3 to 10 of the Period Table or lanthanoid series;
$E^1$ and $E^2$ are respectively a ligand selected from the group consisting of substituted cyclopentadienyl, indenyl, substituted indenyl, heterocyclopentadienyl, substituted heterocyclopentadienyl, amide, phosphide, a hydrocarbon group and a silicon-containing group, which form a cross-linked structure via $A^1$ and $A^2$ and may be the same or different,
X is a ligand capable of forming a σ-bond or π-bond with the proviso that when a plurality of X groups are present, these groups may be the same or different, and may be cross-linked with the other X group, $E^1$, $E^2$ or Y;
Y is a Lewis base with the proviso that when a plurality of Y groups are present, these groups may be same or different, and may be cross-linked with the other Y group, $E^1$, $E^2$ or X;

$A^1$ and $A^2$ are divalent cross-linking groups capable of bonding the two ligands $E^1$ and $E^2$ to each other, are respectively a $C_1$–$C_{20}$ hydrocarbon group, a $C_1$–$C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, a $C_1$–$C_{20}$ hydrocarbon group or a $C_1$–$C_{20}$ halogen-containing hydrocarbon group, and may be the same or different;

q is an integer of 1 to 5 given by the formula:

{(valence of M)–2}; and r is an integer of 0 to 3, and (B) a component selected from the group consisting of (B-1) a compound capable of forming an ionic complex by reacting with the transition metal compound (A) or a derivative thereof, (B-2) aluminoxane, and (B-3) a Lewis acid.

4. The propylene homopolymer according to claim 3, wherein the transition metal compound represented by the general formula (I) is a transition metal compound represented by the general formula (II):

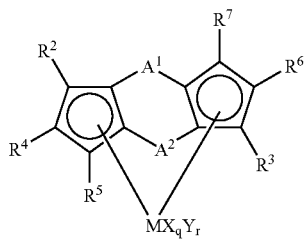

(II)

wherein, M, X, Y, $A^1$, $A^2$, q and r are the same as defined in the above general formula (I); $R^2$ through $R^7$ are respectively a hydrogen atom, a halogen atom, a $C_1$–$C_{20}$ hydrocarbon group, a $C_1$–$C_{20}$ halogen-containing hydrocarbon group, a silicon-containing group or a heteroatom-containing group with the proviso that at least one of $R^2$ through $R^7$ is not a hydrogen atom; and $R^2$ through $R^7$ may be the same or different, and adjacent groups of $R^2$ through $R^7$ may be bonded to each other to form a ring.

5. The propylene homopolymer according to claim 3, wherein the transition metal compound represented by the general formula (I) is a transition metal compound represented by the general formula (II):

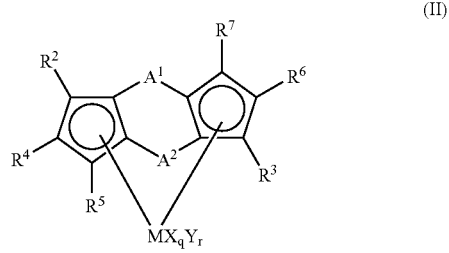

(II)

wherein, M, X, Y, $A^1$, $A^2$, q and r are the same as defined in the above general formula (I); $R^2$ through $R^7$ are respectively a hydrogen atom, a halogen atom, a $C_1$–$C_{20}$ hydrocarbon group, a $C_1$–$C_{20}$ halogen-containing hydrocarbon group, a silicon-containing group or a heteroatom-containing group with the proviso that at least one of $R^2$ through $R^7$ is a group containing a heteroatom such as oxygen, halogen or silicon; and $R^2$ through $R^7$ may be the same or different, and adjacent groups of $R^2$ through $R^7$ may be bonded to each other to form a ring.

6. The propylene homopolymer according to claim 4, wherein the transition metal compound represented by the general formula (II) is a transition metal compound represented by the general formula (III):

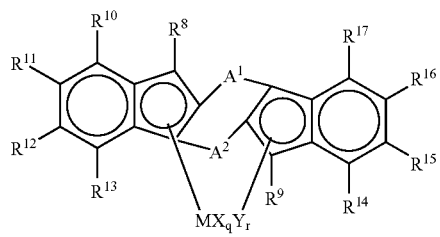

(III)

wherein, M, X, Y, $A^1$, $A^2$, q and r are the same as defined in the above general formula (I); at least one of $R^8$ and $R^9$ represents a group containing a heteroatom such as oxygen, halogen or silicon; and $R^{10}$ through $R^{17}$ are respectively a hydrogen atom, a $C_1$–$C_{20}$ hydrocarbon group, or a group containing a heteroatom such as oxygen, halogen and silicon.

7. A propylene resin composition comprising the propylene homopolymer according to claim 1 and a nucleating agent.

8. A molded product produced by molding the propylene homopolymer according to claim 1.

9. A molded product produced by molding the propylene resin composition according to claim 7.

10. A propylene resin modifier comprising the propylene homopolymer according to claim 1.

\* \* \* \* \*